(12) United States Patent
Conrad

(10) Patent No.: US 12,736,058 B2
(45) Date of Patent: Sep. 15, 2026

(54) MOTOR ASSEMBLY FOR AN APPLIANCE SUCH AS A VACUUM CLEANER AND A VACUUM CLEANER HAVING SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 19/181,838

(22) Filed: Apr. 17, 2025

(65) Prior Publication Data

US 2025/0297613 A1 Sep. 25, 2025

Related U.S. Application Data

(63) Continuation-in-part of application No. 18/499,939, filed on Nov. 1, 2023, now Pat. No. 12,326,151,
(Continued)

(51) Int. Cl.
*F04D 25/06* (2006.01)
*F04D 13/02* (2006.01)
(Continued)

(52) U.S. Cl.
CPC ....... *F04D 25/0693* (2013.01); *F04D 13/027* (2013.01); *F04D 13/0666* (2013.01); *F04D 19/002* (2013.01); *F04D 25/026* (2013.01); *F04D 25/0653* (2013.01); *H02K 7/14* (2013.01); *H02K 16/00* (2013.01); *H02K 16/02* (2013.01); *H02K 21/24* (2013.01); *H02K 49/108* (2013.01); *F04D 13/025* (2013.01);
(Continued)

(58) Field of Classification Search
CPC .......... H02K 16/00; H02K 21/24; H02K 7/14; H02K 16/02; H02K 2213/12; H02K 49/108; F04D 13/0666; F04D 25/0653; F04D 13/027; F04D 19/002; F04D 25/026
See application file for complete search history.

(56) References Cited

U.S. PATENT DOCUMENTS

| | | | | |
|---|---|---|---|---|
| 3,478,237 A * | 11/1969 | Faxon | .................... | H02K 25/00<br>310/233 |
| 3,950,686 A * | 4/1976 | Randall | .................... | H02H 7/08<br>318/564 |

(Continued)

FOREIGN PATENT DOCUMENTS

| | | |
|---|---|---|
| GB | 2408154 A | 5/2005 |
| GB | 2604919 B | 4/2024 |

*Primary Examiner* — Peter J Bertheaud
(74) *Attorney, Agent, or Firm* — Philip C. Mendes da Costa; SMART & BIGGAR LP

(57) ABSTRACT

A motor which may be used within an appliance. The motor may include a fixed stator with a plurality of stator poles provided by electromagnets (e.g. wound coils) and at least one rotor. The activation of the rotor poles (e.g. the number of active rotor poles and/or the rotor pole switching frequency) can be controlled independent of the activation of the stator poles (e.g. the number of active stator poles and/or stator pole switching frequency). The motor may include multiple rotors connected in sequence to allow for increased fan speeds with relatively decreased dB level as well as a decrease in the size of the fan assembly.

20 Claims, 16 Drawing Sheets

Related U.S. Application Data which is a continuation of application No. 17/178,030, filed on Feb. 17, 2021, now Pat. No. 11,841,024.

(51) Int. Cl.

| | |
|---|---|
| ***F04D 13/06*** | (2006.01) |
| ***F04D 19/00*** | (2006.01) |
| ***F04D 25/02*** | (2006.01) |
| ***F04D 25/16*** | (2006.01) |
| ***F04D 29/043*** | (2006.01) |
| ***H02K 7/14*** | (2006.01) |
| ***H02K 16/00*** | (2006.01) |
| ***H02K 16/02*** | (2006.01) |
| ***H02K 21/24*** | (2006.01) |
| ***H02K 49/10*** | (2006.01) |
| ***H02P 5/48*** | (2016.01) |

(52) U.S. Cl.

CPC .......... *F04D 13/026* (2013.01); *F04D 19/007* (2013.01); *F04D 25/0613* (2013.01); *F04D 25/166* (2013.01); *F04D 29/043* (2013.01); *H02K 16/025* (2013.01); *H02K 49/106* (2013.01); *H02K 2213/12* (2013.01); *H02P 5/48* (2013.01)

(56) References Cited

U.S. PATENT DOCUMENTS

| | | | |
|---|---|---|---|
| 5,285,124 | A * | 2/1994 | Satake .................. H02K 16/00 310/124 |
| 8,575,880 | B2 | 11/2013 | Grantz |
| 8,710,711 | B2 | 4/2014 | Pennander et al. |
| 10,995,754 | B2 | 5/2021 | Doepker et al. |
| 11,563,347 | B2 | 1/2023 | Pennington, III et al. |
| 11,916,451 | B2 | 2/2024 | Sheth et al. |
| 11,973,447 | B2 | 4/2024 | Chen |
| 12,046,956 | B2 | 7/2024 | Bussires et al. |
| 2007/0138904 | A1 | 6/2007 | Chae |
| 2008/0061649 | A1 | 3/2008 | Kim et al. |
| 2010/0295389 | A1 | 11/2010 | Tessier et al. |
| 2019/0089289 | A1 | 3/2019 | Cherepinsky et al. |
| 2023/0396130 | A1 | 12/2023 | Liu et al. |

* cited by examiner

MOTOR ASSEMBLY FOR AN APPLIANCE SUCH AS A VACUUM CLEANER AND A VACUUM CLEANER HAVING SAME

CROSS-REFERENCE TO RELATED APPLICATIONS

This application is a continuation-in-part of co-pending U.S. patent application Ser. No. 18/499,939, filed on Nov. 1, 2023, which itself is a continuation of U.S. patent application Ser. No. 17/178,030, filed on Feb. 17, 2021 and issued as U.S. Pat. No. 11,841,024 on Dec. 12, 2023, the entirety of each of which is hereby incorporated by reference.

FIELD

This disclosure relates generally to motor assemblies for use in appliances and, optionally, in portable appliances such as surface cleaning apparatuses, room air cleaners, hair dryers, and hand dryers.

INTRODUCTION

The following is not an admission that anything discussed below is part of the prior art or part of the common general knowledge of a person skilled in the art.

Various types of fan and motor assemblies for use in portable, lower power appliances are known. For example, fan and motor assemblies are commonly found in products such as corded and cordless vacuum cleaners, carpet extractors, hair dryers, hand dryers, and room air cleaners/purifiers. In these appliances, the fan and motor assembly comprise one rotor and one stator that drive an output shaft.

Fan and motor assemblies that are commonly found in appliances are generally optimized for one rotational fan speed, dB level (i.e., quietness), size, and use (i.e., high suction or high air flow), or are designed such that all characteristics are balanced. For example, appliances may give up rotational fan speed for a particular dB level or may give up rotational fan speed for overall size of the appliance.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect of this disclosure, which may be used by itself or with one or more of the other aspects disclosed herein, there is provided a motor which may be used within an appliance. The motor may include a fixed stator with a plurality of stator poles provided by electromagnets (e.g. wound coils) and at least one rotor. The activation of the rotor poles (e.g. the number of active rotor poles and/or the rotor pole switching frequency) can be controlled independent of the activation of the stator poles (e.g. the number of active stator poles and/or stator pole switching frequency).

In accordance with this aspect, there is provided a motor comprising: a stator comprising a plurality of circumferentially spaced stator poles and a plurality of stator coils, the plurality of stator coils comprising a plurality of stator pole coils corresponding to the plurality of stator poles; a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles; and at least one controller, the at least one controller operable to independently control activation of the stator poles and the first rotor poles to thereby induce rotation of the motor, wherein the at least one controller is operable to control the provision of a rotor control signal to the first rotor, wherein the rotor control signal is defined to control the activation of the first rotor poles.

The at least one controller may be operable to independently control at least one of a stator switching frequency of the stator poles and a first rotor switching frequency of the first rotor poles.

The at least one controller may be operable to independently control the stator switching frequency of the stator poles and the first rotor switching frequency of the first rotor poles.

One of the stator switching frequency of the stator poles and the first rotor switching frequency of the first rotor poles may be a fixed frequency.

The at least one controller may be operable to control a stator pole active number of stator poles.

The at least one controller may be operable to control a first rotor pole active number of first rotor poles.

The first rotor may receive first rotor power to activate the first rotor poles from the stator via an electromagnetic coupling between the stator and the first rotor.

The first rotor may receive first rotor power to activate the first rotor poles from the stator via brushes.

The motor may include a second rotor, where the first rotor is positioned between the stator and the second rotor, and the first rotor may be operable to couple second rotor power to the second rotor, where the second rotor power is received from the stator along with the first rotor power.

The motor may include a second rotor, where the first rotor is positioned between the stator and the second rotor, and the second rotor includes a plurality of circumferentially spaced second rotor poles and a plurality of second rotor coils, the plurality of second rotor coils comprising a plurality of second rotor pole coils corresponding to the plurality of second rotor poles, where the plurality of second rotor poles are positioned in a facing arrangement with a plurality of second stator poles provided by a rotatable second stator, where rotation of the second stator is driven by rotation of the first rotor.

The second stator may be integral with the first rotor.

The first rotor may be coupled to an external power source and the stator may be separately coupled to the external power source, and the first rotor can receive first rotor power to activate the first rotor poles from the external power source.

The first rotor may be coupled to the external power source by a plurality of brushes, and the plurality of brushes may be arranged to contact a central portion of the first rotor.

The at least one controller may include a rotor controller positioned onboard the first rotor, where the rotor controller may be operable to define a first rotor pole switch signal to control the activation of the first rotor poles.

The rotor controller may further include power conversion circuitry operable to convert received DC power into AC first rotor power to activate the first rotor poles.

The first rotor may be operable to receive a first rotor pole switch signal to control the activation of the first rotor poles.

The first rotor may include a passive switching circuit operable to adjust a frequency of activation of the first rotor poles in response to receiving the first rotor pole switch signal.

The motor may further include a first rotor position sensor operable to detect a rotational position of the first rotor, where the at least one controller may be operable to independently control activation of the stator poles and the first rotor poles based on the detected rotational position of the first rotor.

In an aspect of this disclosure, there is provided a motor comprising: a first stator comprising a plurality of circumferentially spaced first stator coils, the plurality of first stator coils defining a plurality of first stator poles, wherein the first stator is fixed; a first rotor comprising a plurality of circumferentially spaced first rotor coils, the plurality of first rotor coils defining a plurality of first rotor poles, wherein the plurality of first rotor poles are positioned in a facing arrangement with the plurality of first stator poles; a movable second stator drivingly connected to the first rotor, the second stator comprising a plurality of circumferentially spaced second stator coils, the plurality of second stator coils defining a plurality of second stator poles, wherein rotation of the second stator is driven by rotation of the first rotor; and a second rotor comprising a plurality of circumferentially spaced second rotor coils, the plurality of second rotor coils defining a plurality of second rotor poles, wherein the plurality of second rotor poles are positioned in a facing arrangement with the plurality of second stator poles.

The second stator and first rotor may be integral.

The first rotor may be positioned between the second rotor and the first stator.

The motor may include a movable third stator drivingly connected to the second rotor, the third stator including a plurality of circumferentially spaced third stator coils, the plurality of third stator coils defining a plurality of third stator poles, where rotation of the third stator is driven by rotation of the second rotor; and a third rotor including a plurality of circumferentially spaced third rotor coils, the plurality of third rotor coils defining a plurality of third rotor poles, wherein the plurality of third rotor poles are positioned in a facing arrangement with the plurality of third stator poles.

At least one of the second rotor or the third rotor may be drivingly connected to a motor output shaft.

In an aspect of this disclosure, the rotor poles can be provided by electromagnets with at least two different phases. The switching frequency of the rotor poles and/or the number of rotor poles active at a given time can be controlled independently of the activation of the stator poles. The rotor poles can be controlled by a controller that is onboard the rotor itself. A separate controller can be provided to control the switching of the stator poles.

The stator controller may also control power transmission to the rotor. Power can be transmitted to the rotor by electromagnetic induction (e.g. between some sets of stator poles and rotor poles) and/or using brushes and a slip ring. The power transmitted to the rotor can include both the power required for the controller to operate and the power to be supplied to the rotor pole coils.

Optionally, multiple rotors may be provided in sequence. Power may be transmitted to each rotor sequentially. Alternatively, power may be transmitted separately to each rotor.

The controller onboard the rotor can generate control signals to activate the rotor poles according to a control algorithm. Optionally, the motor can include a position sensor that is used to determine the rotational position of the rotor. The control signals can be defined at least in part on the rotational position of the motor.

In accordance with this aspect of the disclosure, there is provided a motor comprising: a stator comprising a plurality of circumferentially spaced stator poles and a plurality of stator coils, the plurality of stator coils comprising a plurality of stator pole coils corresponding to the plurality of stator poles; a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles; a stator controller operable to control activation of the stator poles; and a rotor controller positioned onboard the first rotor, wherein the rotor controller is operable to define a first rotor pole switch signal to control the activation of the first rotor poles; wherein the stator controller and the first rotor controller are operable to independently control activation of the stator poles and the first rotor poles to thereby induce rotation of the motor.

The rotor controller may be operable to adjust a number of active first rotor poles during rotation of the motor.

The rotor controller may be operable to adjust a switching frequency of the first rotor poles during rotation of the motor.

The first rotor may receive first rotor power to activate the first rotor poles from the stator via an electromagnetic coupling between the stator and the first rotor.

The first rotor may receive first rotor power to activate the first rotor poles from the stator via brushes.

The first rotor may be coupled to an external power source and the stator may be separately coupled to the external power source, and the first rotor may receive first rotor power to activate the first rotor poles from the external power source.

The first rotor may be coupled to the external power source by a plurality of brushes, and the plurality of brushes may be arranged to contact a central portion of the first rotor.

The motor may include a second rotor, where the first rotor may be positioned between the stator and the second rotor, and the first rotor may be operable to couple second rotor power to the second rotor, where the second rotor power is received from the stator along with the first rotor power.

The motor may include a second rotor controller positioned onboard the second rotor, where the second rotor controller may be operable to define a second rotor pole switch signal to control the activation of the second rotor poles.

In accordance with this aspect of the disclosure, there is provided a motor comprising: a stator comprising a plurality of circumferentially spaced stator poles and a plurality of stator coils, the plurality of stator coils comprising a plurality of stator pole coils corresponding to the plurality of stator poles; a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles; and a first rotor controller provided on the first rotor and electrically coupled to the plurality of first rotor coils, the first rotor controller configured to control a flow of current through the first rotor pole coils to drive rotation of the first rotor relative to the stator.

The plurality of stator coils may include a stator transformer coil; the plurality of first rotor coils may include a first rotor transformer coil inductively coupled to the stator transformer coil; and the first rotor controller may be powered by power inductively coupled from the stator transformer coil to the first rotor transformer coil.

The first rotor may omit an electrical connection to a power source.

The plurality of stator coils may be electrically connected to a power source.

The stator may be nested within the first rotor with the plurality of first rotor poles arranged radially outward from the plurality of stator poles.

The first rotor may be axially spaced from the stator.

The motor may include a second rotor including a plurality of circumferentially spaced second rotor poles and a plurality of second rotor coils, the plurality of second rotor coils may include a plurality of second rotor pole coils corresponding to the plurality of second rotor poles; and a second rotor controller provided on the second rotor and electrically coupled to the plurality of second rotor coils, where the second rotor controller may be operable to control a second flow of current through the second rotor pole coils to drive rotation of the second rotor relative to the first rotor.

The second rotor controller may be powered by power inductively coupled from the first rotor.

The first rotor may be nested within the second rotor with the plurality of second rotor poles arranged radially outward from the plurality of first rotor poles.

The stator may be nested within the first rotor with the plurality of first rotor poles arranged radially outward from the plurality of stator poles.

The second rotor controller may be operable to control the second flow of current through the second rotor pole coils to drive rotation of the second rotor relative to the stator at a higher speed than the rotation of the first rotor relative to the stator.

The first rotor may be coupled to a first output shaft and the second rotor may be coupled to a different output shaft.

The motor may omit any permanent magnets.

In accordance with this aspect of the disclosure, there is provided a motor comprising: a stator comprising a plurality of circumferentially spaced stator poles and a plurality of stator coils, the plurality of stator coils comprising a plurality of stator pole coils; a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles; and a second rotor comprising a plurality of circumferentially spaced second rotor poles and a plurality of second rotor coils, the plurality of second rotor coils comprising a plurality of second rotor pole coils corresponding to the plurality of second rotor poles; a first rotor controller provided on the first rotor and electrically connected to the plurality of first rotor coils, wherein the first rotor controller is operable to control a first flow of current through the first rotor pole coils to drive rotation of the first rotor relative to the stator; and a second rotor controller provided on the second rotor and electrically connected to the plurality of second rotor coils, wherein the second rotor controller is operable to control a second flow of current through the second rotor pole coils to drive rotation of the second rotor relative to the first rotor.

The second rotor controller may be operable to control the second flow of current through the second rotor pole coils to drive rotation of the second rotor relative to the stator at a higher speed than the rotation of the first rotor relative to the stator.

The first rotor may be drivingly coupled to a first output shaft and the second rotor may be drivingly coupled to a different output shaft.

The first rotor controller may be powered by power inductively coupled from the plurality of stator coils to the plurality of first rotor coils.

The second rotor controller may be powered by power inductively coupled from the first rotor.

The first rotor may omit an electrical connection to a power source.

The second rotor may omit an electrical connection to a power source.

In an aspect of this disclosure, the rotor poles can be provided by electromagnets with at least two different phases while the rotor omits an onboard controller. A control signal can be provided to the rotor through electromagnetic coupling and/or brushes and slip ring. The rotor can include a passive onboard circuit that can adjust the switching frequency for the rotor poles. For example, the rotor can include circuitry onboard that oscillates at different frequencies in response to different applied voltages and voltage signals can be provided to the rotor to control the switching frequency.

In an aspect of this disclosure, the rotor poles can be provided by permanent magnets. The permanent magnets may be movable radially to adjust the number of active rotor poles at a given time. At least some of the permanent magnets can be provided in radially extending channels. The permanent magnets can move radially along the corresponding channels to adjust the number of active rotor poles at a given time. Optionally, the permanent magnets may be biased to an inner position along the channel and then moved out centrifugally as speed increases to increase the number of rotor poles. The rotor poles may use a mechanical movement member, such as a spring, to adjust the position of the permanent magnets.

In accordance with this aspect of the disclosure, there is provided a motor comprising: a stator comprising a plurality of circumferentially spaced stator poles and a plurality of stator coils, the plurality of stator coils comprising a plurality of stator pole coils corresponding to the plurality of stator poles; a first rotor comprising a plurality of circumferentially spaced first rotor permanent magnets, the first rotor permanent magnets arranged to define a plurality of first rotor poles positioned in a facing arrangement with the plurality of stator poles, wherein a movable subset of the first rotor permanent magnets are movable in a radial direction to adjust a number of active first rotor poles; and at least one controller operable to control activation of the stator poles to thereby induce rotation of the motor.

The movable subset of the first rotor permanent magnets may be automatically movable in the radial direction in response to an increase in rotational speed of the first rotor.

Each movable first rotor permanent magnet in the movable subset of the first rotor permanent magnets may be positioned in a corresponding radially extending channel; each radially extending channel may have a corresponding mechanical member operable to move radially within the channel; each movable first rotor permanent magnet may be movable in the radial direction along the corresponding radially extending channel in response to motion of the mechanical member.

The mechanical movement member may include a spring.

The spring may be biased to a recessed position, and in the recessed position the corresponding movable first rotor permanent magnet may be positioned at a radial inward end of the corresponding radially extending channel.

In an aspect of this disclosure, a fan assembly, which may be used within an appliance, can be controlled using the motor configurations described herein. Optionally, the motor may include at least first and second connected motors. Connecting multiple motors, as opposed to utilizing one motor, can allow for increased fan speeds with relatively decreased dB level as well as a decrease in the size (specifically the diameter) of the fan assembly. Accordingly, the output shaft of one motor may be drivingly connected to a second motor. For example, the rotor of one motor may be drivingly connected to the stator of a second motor. Therefore, the rotation produced by the first motor causes the stator of the second motor to rotate. The rotation induced to the rotor of the second motor is therefore essentially added to the rotation produced by the first motor.

In accordance with this aspect of the disclosure, there is provided a surface cleaning apparatus comprising: a dirt inlet fluidly coupled to an airflow pathway; a fan assembly coupled to the airflow pathway, the fan assembly including a first fan; and a fan motor drivingly connected to the fan assembly, the fan motor comprising: a stator comprising a plurality of circumferentially spaced stator poles and a plurality of stator coils, the plurality of stator coils comprising a plurality of stator pole coils corresponding to the plurality of stator poles; a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles; and a first rotor controller provided on the first rotor and electrically coupled to the plurality of first rotor coils, the first rotor controller configured to control a flow of current through the first rotor pole coils to drive rotation of the first rotor relative to the stator and thereby drive the first fan.

The plurality of stator coils may include a stator transformer coil; the plurality of first rotor coils may include a first rotor transformer coil inductively coupled to the stator transformer coil; and the first rotor controller may be powered by power inductively coupled from the stator transformer coil to the first rotor transformer coil.

The plurality of stator coils may be electrically connectable to an apparatus power source.

The apparatus power source may include an onboard energy storage member.

The fan motor may further include: a second rotor including a plurality of circumferentially spaced second rotor poles and a plurality of second rotor coils, the plurality of second rotor coils including a plurality of second rotor pole coils corresponding to the plurality of second rotor poles; and a second rotor controller provided on the second rotor and electrically coupled to the plurality of second rotor coils, where the second rotor controller may be operable to control a second flow of current through the second rotor pole coils to drive rotation of the second rotor relative to the first rotor.

The second rotor controller may be operable to control the second flow of current through the second rotor pole coils to drive rotation of the second rotor relative to the stator at a higher speed than the rotation of the first rotor relative to the stator.

The fan assembly may include a second fan; the first rotor may be drivingly connected to the first fan, whereby rotation of the first rotor drives the first fan; and the second rotor may be drivingly connected to the second fan, whereby rotation of the second rotor drives the second fan.

The second rotor controller may be operable to control the second flow of current through the second rotor pole coils to drive rotation of the second rotor relative to the stator at a higher speed than the rotation of the first rotor relative to the stator thereby driving the second fan at a higher fan speed than the first fan.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
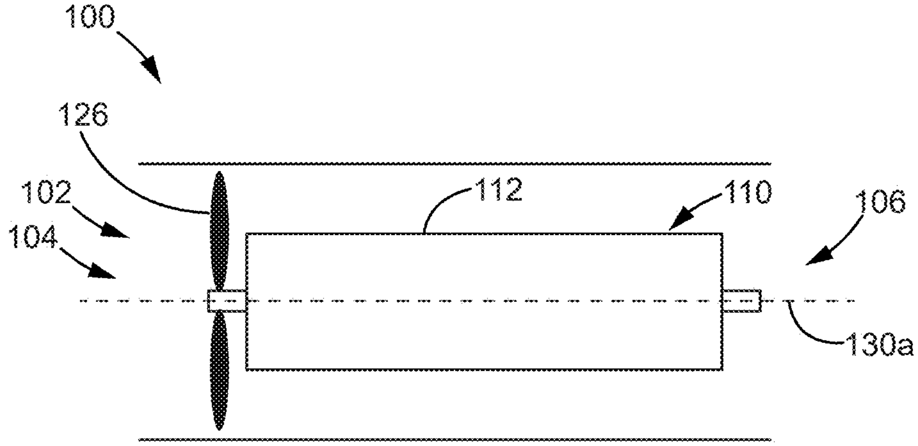
FIG. 1 is a schematic illustration of an example appliance having a fan and motor assembly provided in an air flow passage.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

General Description of a Fan and Motor Assembly

Described herein are motor arrangements that may be used to produce an air moving member (e.g., a suction motor). The motor arrangement may drive one or more impellers and/or propellers. For example, as exemplified herein, a series of motor units (a stator and a rotor) may have a drive shaft, such as an output shaft, having one or more impellers and/or propellers thereon. The series of motors units can include a sequence of rotors that can sequentially increase the rotational speed of each subsequent rotor, enabling the motor to achieve higher RPMs with lower switching frequencies and reduced size.

FIG. 1 exemplifies an appliance 100 that has an air flow passage 102 with a fan and motor assembly 110 therein (which may also be referred to as a fan assembly). The fan assembly 110, as described subsequently, may improve the versatility, efficiency, and/or portability of the appliance 100. In some examples, the appliance 100 may be surface cleaning apparatus, such as an upright vacuum cleaner, a stick vacuum cleaner, a hand vacuum cleaner, a canister vacuum cleaner, a wet/dry vacuum cleaner or a carpet extractor. The surface cleaning apparatus can have a dirt inlet fluidly coupled to the airflow pathway 102.

In other examples, the appliance 100 may be any one of a hair dryer, a hand dryer, and a room air cleaner (which could also be referred to as a room air purifier). Each appliance 100 may be corded and/or cordless (i.e., portable). A fan assembly 110 can be coupled to the airflow pathway 102 and can include a first fan 126. A fan motor 110 can be drivingly connected to the fan assembly 110 to urge the flow of air through the air flow pathway 102.

Referring now to FIGS. 1 and 2A-2E, shown therein is an example of an appliance 100 having an air flow passage 102 that extends from an air inlet 104 to an air outlet 106. In the example illustrated, a fan assembly 110 is provided in the air flow passage 102 to urge air through the air flow passage 102.

The fan assembly 110 includes a motor unit 112. The motor 112 includes a first rotor 114 and a first fixed stator 116.

The motor 112 includes a first rotatable output shaft 125. The first rotatable output shaft 125 is rotated by the first rotor 114. That is, the first rotatable output shaft 125 is drivingly connected to the first rotor 114 and has an RPM equal to the RPM of the first rotor 114.

Figure 2A:
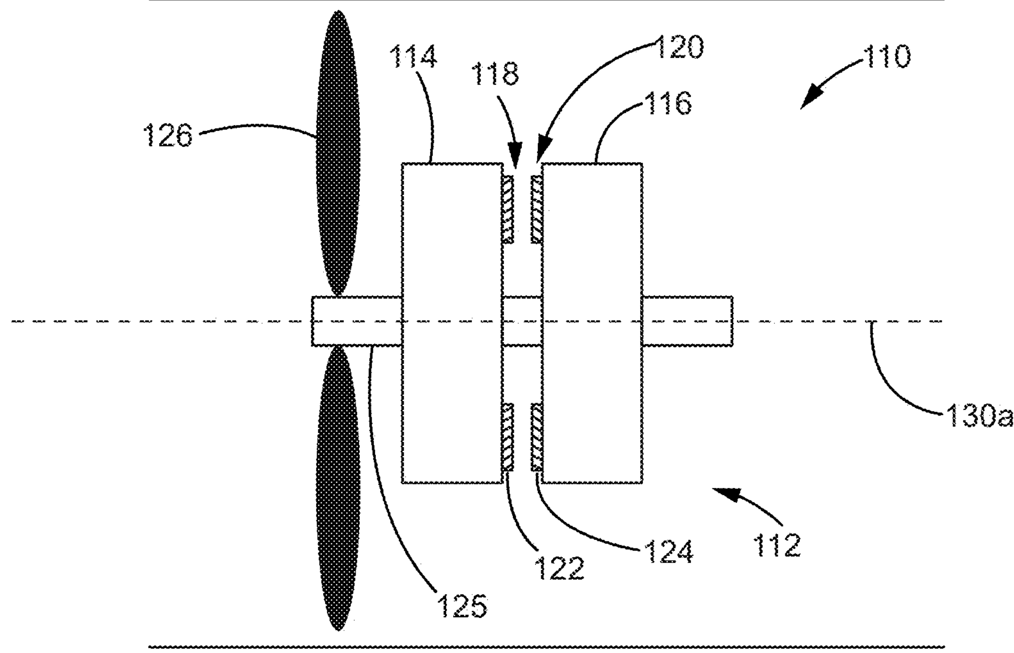
FIG. 2A is a schematic sideview of a first example motor assembly provided in an air flow passage.

As shown in FIG. 2A, the first rotatable output shaft 125 may be drivingly connected to a fan blade 126. Depending on the desired characteristics of the appliance 100, the fan blade 126 may be either an impeller or a propeller. The rotation of the first rotor 114 can be controlled to drive rotation of the output shaft 125 and thereby in turn drive rotation of the blade 126 to urge the flow of air through air flow passage 102.

As understood in the art, the first rotor 114 has a rotor magnetic portion 118 and the first stator 116 has a stator magnetic portion 120. Referring to FIG. 2A, in the example illustrated, the rotor magnetic portion 118 is provided by electromagnets (i.e. wound rotor coils 122) and stator magnetic portion 120 is also provided by electromagnets (i.e. wound stator coils 124).

Optionally, the motor 112 may omit any permanent magnets as in the example shown. Alternatively, one or more permanent magnets may be provided in the rotor magnetic portion 118 and/or stator magnetic portion, as shown in the examples of FIGS. 5A-5D described herein below.

The stator 116 can be configured to define a plurality of circumferentially spaced stator poles. A plurality of stator coils 124 can be provided on the stator 116. The plurality of stator coils 124 can include a plurality of stator pole coils corresponding to the plurality of stator poles. In some cases, all the stator coils 124 may be stator pole coils.

The rotor 114 can be configured to define a plurality of circumferentially spaced rotor poles. A plurality of rotor coils 122 can be provided on the rotor 114 (see e.g. FIG. 2D). The plurality of rotor coils 122 can include a plurality of rotor pole coils corresponding to the plurality of rotor poles. In some cases, all the rotor coils 122 may be rotor pole coils.

The rotor pole coils 122 and stator pole coils 124 can be activated in a controlled manner to cause the stator poles and rotor poles to selectively attract and repel one another to thereby drive rotation of the rotor 114. The motor 112 can be configured to independently control the activation of the rotor poles (e.g. the number of active rotor poles and/or the rotor pole switching frequency) and the activation of the stator poles (e.g. the number of active stator poles and/or stator pole switching frequency). This can provide greater flexibility in driving the motor 112.

The rotor 114 can be configured to operate with at least two different rotor phases. That is, the rotor coils 122 can define a plurality of electromagnetic rotor phases. The coils 122 within each phase can be collectively activated and deactivated as a rotor phase.

Figure 2B:
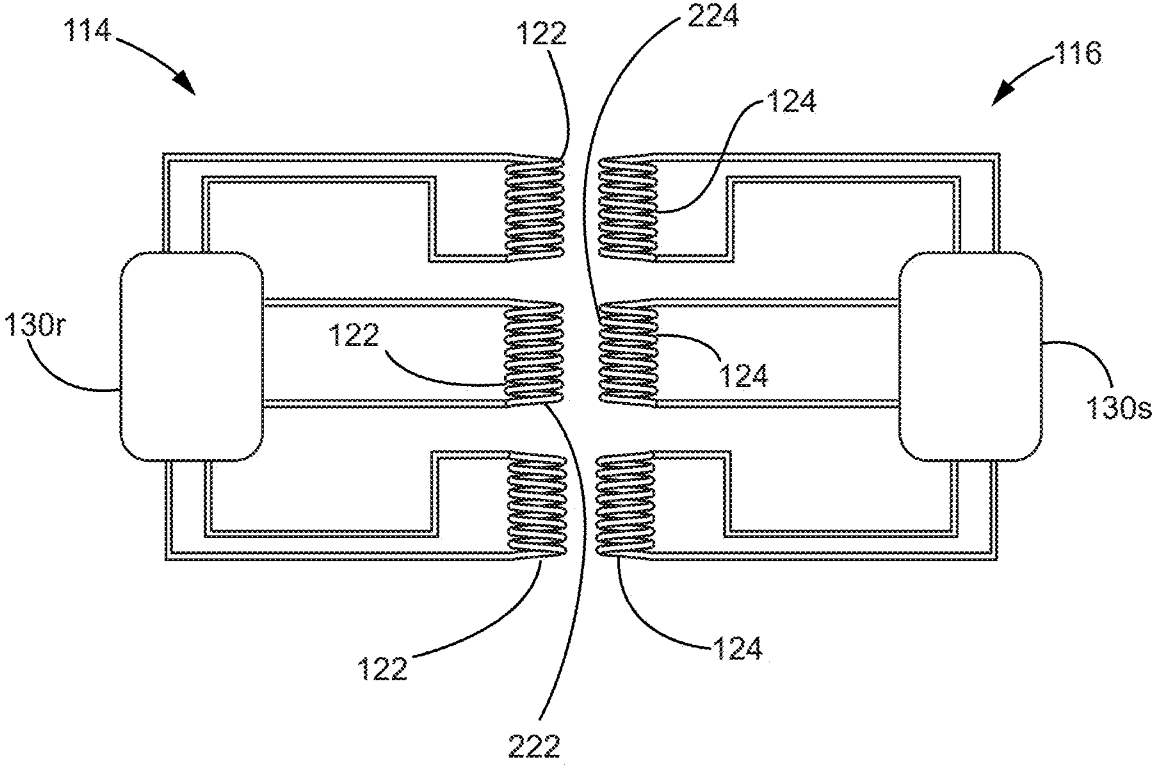
FIG. 2B is a partial schematic illustration of the first example motor assembly.
Figure 2C:
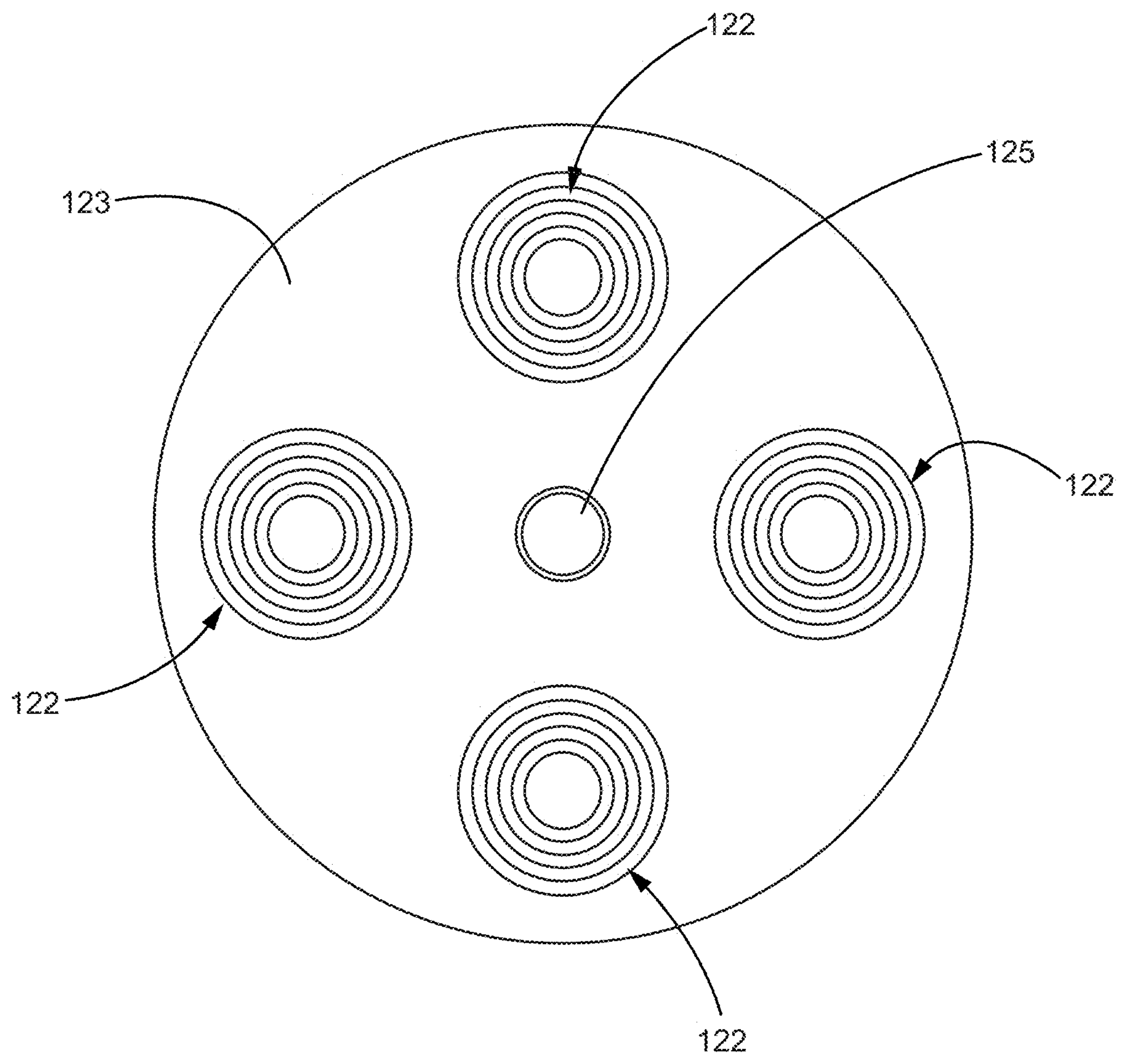
FIG. 2C is a schematic top view of the first example motor assembly.
Figure 2D:
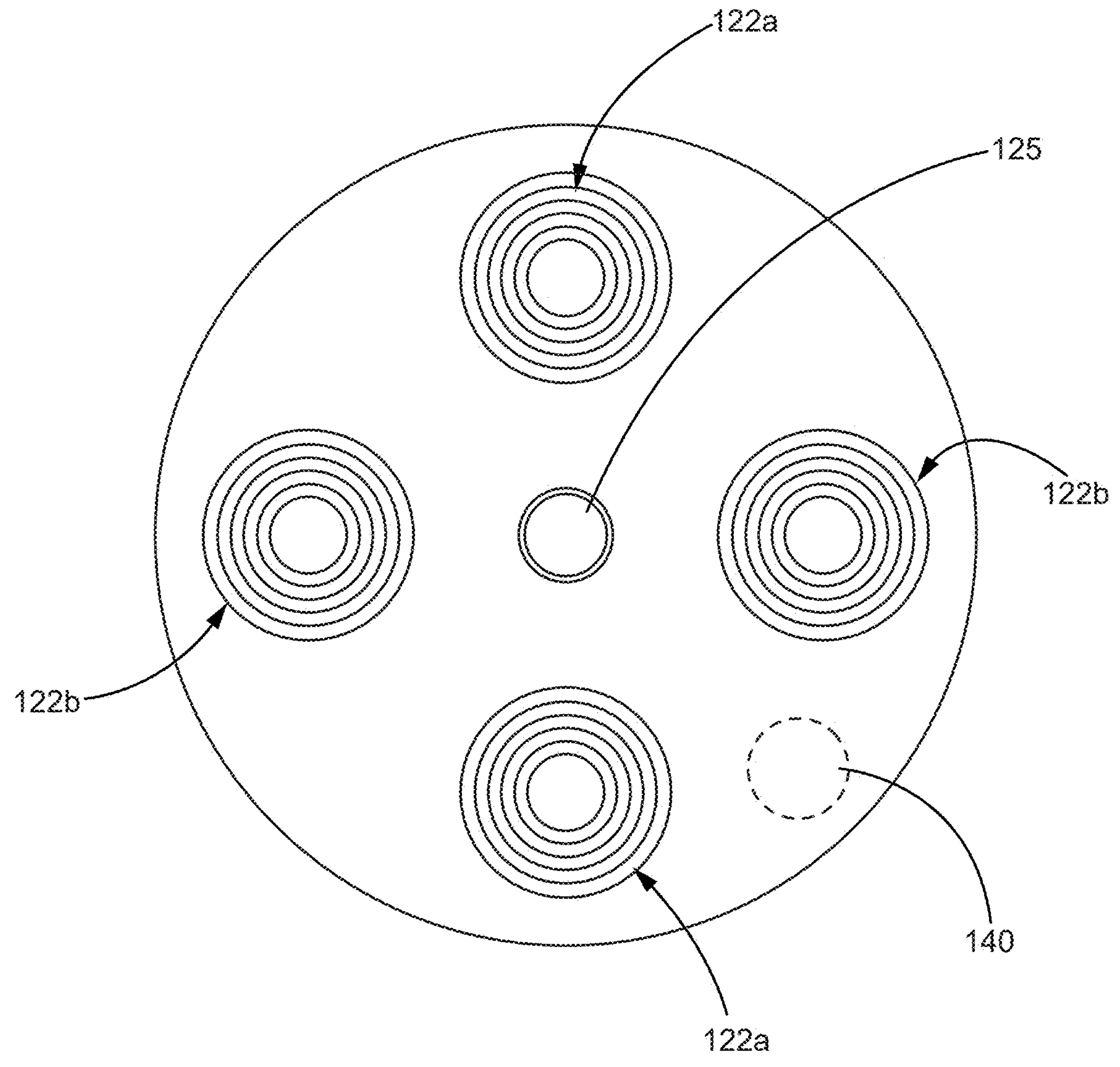
FIG. 2D is a schematic top view of a first alternate version of the first example motor assembly.

For example, FIG. 2D illustrates a rotor having two rotor phases. Rotor coils 122*a* correspond to a first rotor phase while rotor coils 122*b* correspond to a second rotor phase. The rotor coils 122*a* in the first rotor phase can be activated and deactivated collectively. Similarly, the rotor coils 122*b* in the second rotor phase can be activated and deactivated collectively. However, the rotor coils 122*a* in the first rotor phase can be activated separately from the rotor coils 122*b* in the second rotor phase.

Figure 2E:
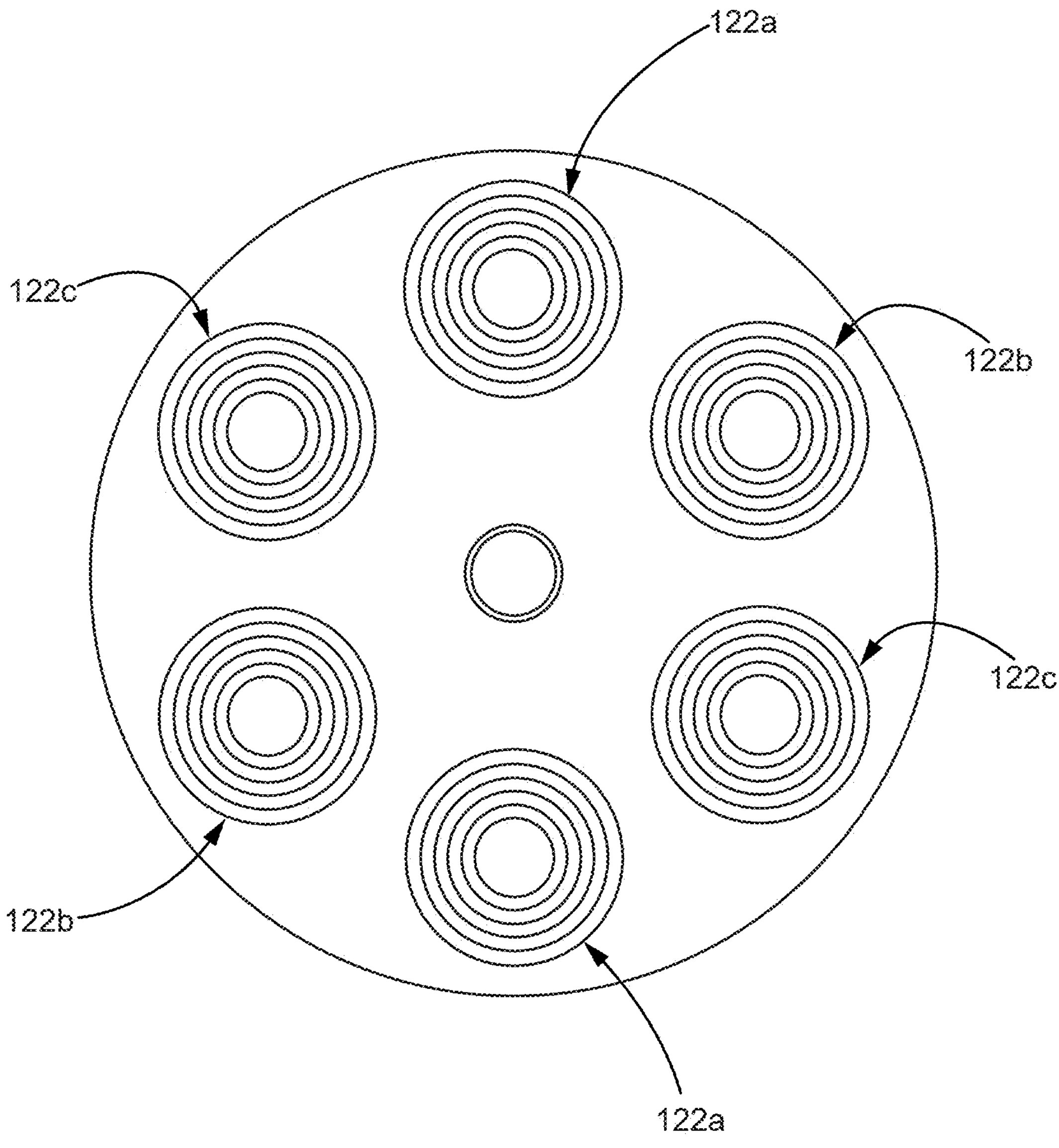
FIG. 2E is a schematic top view of a second alternate version of the first example motor assembly.

FIG. 2E illustrates a rotor having three rotor phases. As shown in FIG. 3E, rotor coils 122*a* correspond to a first rotor phase, rotor coils 122*b* correspond to a second rotor phase, and rotor coils 122*c* correspond to a third rotor phase. Again, the rotor coils 122*a* in the first rotor phase can be activated and deactivated collectively; the rotor coils 122*b* in the second rotor phase can be activated and deactivated collectively; and the rotor coils 122*c* in the third rotor phase can be activated and deactivated collectively. Similarly, the rotor coils 122*a* in the first rotor phase can be activated separately from both the rotor coils 122*b* in the second rotor phase and the rotor coils 122*c* in the third rotor phase; the rotor coils 122*b* in the second rotor phase can be activated separately from both the rotor coils 122*a* in the first rotor phase and the rotor coils 122*c* in the third rotor phase; and the rotor coils 122*c* in the third rotor phase can be activated separately from both the rotor coils 122*a* in the first rotor phase and the rotor coils 122*b* in the second rotor phase.

Although the examples shown in FIGS. 2D and 2E illustrate two rotor phases and three rotor phases respectively, it will be appreciated that the specific number of rotor phases and/or stator phases may be adjusted in different implementations of the motor 112.

The plurality of rotor poles and the plurality of stator poles can be positioned in a facing arrangement. As shown in the example of FIG. 2A, the rotor 114 can be axially spaced from the stator 116. Accordingly, the rotor poles and stator poles can be axially spaced from one another (i.e. along output shaft longitudinal axis 130*a*) while arranged in a facing relationship. Therefore, in accordance with the principles of electromagnetism, the first stator 116 can drive rotation of the first rotor 114 at a specified RPM (RPM of the first motor 112) through selective activation of the stator and rotor poles.

The motor 112 can also include at least one controller 130 (see e.g. FIG. 2B). The at least one controller can be configured to selectively activate the rotor poles and stator poles to drive rotation of the motor.

The least one controller can be configured to control the flow of current through the stator and rotor poles to drive the motor in accordance with a specified control algorithm. The control algorithm implemented by the at least one controller can vary depending on various factors, such as the specific implementation of the motor 112 and/or its intended use. The at least one controller can store the motor control algorithm in local non-transitory memory accessible to the at least one controller.

The at least one controller can control the provision of a rotor control signal to the first rotor 114. The rotor control signal can be defined to control the activation of the first rotor poles.

The at least one controller can also control the provision of a stator control signal to the first stator 116. The stator control signal can be defined the control the activation of the first stator poles.

The controller can be configured to independently control activation of the stator poles (e.g. the number of active stator poles and/or stator pole switching frequency) and activation of the first rotor poles (e.g. the number of active rotor poles and/or the rotor pole switching frequency) to thereby induce rotation of the motor 112. The at least one controller can be configured to independently control the activation of the rotor poles and stator poles in various ways.

Optionally, the at least one controller 130 may be operable to independently control a stator switching frequency of the stator poles. Alternatively or in addition, the at least one controller 130 may be operable to independently control a first rotor switching frequency of the first rotor poles.

Optionally, one of the stator switching frequency of the stator poles and the first rotor switching frequency of the first rotor poles may be a fixed frequency. Alternatively, the at least one controller may be operable to independently control both the stator switching frequency of the stator poles and the first rotor switching frequency of the first rotor poles Alternatively or in addition, the at least one controller may be operable to control a number of active stator poles and/or rotor poles. For example, the at least one controller may be operable to control a stator pole active number of stator poles. Alternatively or in addition, the at least one controller may be operable to control a first rotor pole active number of first rotor poles.

Alternatively or in addition, the rotor coils 122 and/or stator coils 124 may be activated based on a rotational position of the rotor 114. For example, the motor 112 may include a position sensor 140 operable to determine the current rotational position of the rotor 114. The activation of the rotor coils 122 and/or stator coils 124 may then be defined based, at least in part, on a position signal received from the position sensor 140.

As shown in the example of FIG. 2D, the rotor 114 can include a position sensor 140. The position sensor 140 can be used to determine the rotational position of the rotor 114. Various different types of sensors, such as optical sensors or magnetic sensors (e.g. hall effect sensors) can be used as the position sensor 140.

The control signals used to activate the rotor poles and/or stator poles can be defined at least in part on the rotational position of the rotor 114 (e.g. as detected by the position sensor 140). That is, the at least one controller 130 can be configured to independently control activation of the stator poles and the first rotor poles based on the detected rotational position of the first rotor.

The at least one controller can include a stator controller 130*s* electrically connected to the stator coils 124. The stator controller 130*s* can be configured to selectively activate the stator coils 124 (i.e. selectively provide current through the coils 124) to induce rotation of the rotor 114.

Optionally, the at least one controller may include a rotor controller 130*r*. The rotor controller 130*r* can be electrically connected to the plurality of rotor coils 122. The rotor controller 130*r* can be configured to selectively activate the rotor coils 122. The first rotor controller 130*r* can be configured to control a flow of current through the first rotor pole coils to drive rotation of the first rotor 114 relative to the stator 116 (and thereby drive the first fan 126 as shown in the example of FIG. 2B).

Optionally, the rotor poles can be controlled by a controller 130*r* that is onboard the rotor 114 itself. As shown in the example of FIG. 2B, the at least one controller can include a first rotor controller 130*r* provided on the first rotor 114. A separate controller (e.g. stator controller 130*s*) can be provided to control the switching of the stator poles.

Optionally, the onboard rotor controller 130*r* can generate control signals to activate the rotor poles according to a rotor control algorithm stored in non-transitory memory of the controller 130*r*.

Optionally, the rotor coils 122 may be activated in response to rotor control signals from a stator controller 130*s* (or other motor controller) transmitted to the rotor controller 130*r*.

Alternatively, an onboard rotor controller 130*r* may be omitted. For example, the rotor 114 may omit any active electronics onboard. This may simplify the design and connectivity of the rotor 114.

Optionally, the rotor 114 may include passive control circuitry onboard. The passive rotor control circuitry can be configured to selectively activate the rotor coils 122 in response to a rotor control signal received by the rotor (e.g. from a stator controller 130*s* or other motor controller).

Optionally, the passive rotor control circuitry may include an oscillatory circuit that can be configured to adjust the switching frequency for the rotor coils 122. For example, the oscillatory circuit can be configured to oscillate at different frequencies in response to different applied voltages. The rotor control signal can be defined to apply different voltage signals to the rotor to thereby control the switching frequency of the rotor coils 124 using the passive control circuitry.

The plurality of stator coils 124 may be electrically connectable to an apparatus power source. For example, the apparatus may be connectable to an external power source (e.g. mains power) to supply power to the stator coils 124 (and/or rotor coils 122). Alternatively or in addition, the apparatus power source may include one or more onboard energy storage members.

Optionally, the first rotor may be electrically connectable to the apparatus power source. The first rotor 114 may receive power from the apparatus power source to activate the rotor coils 122 and to power an onboard rotor controller 130*r* (if present).

The at least one controller can include power conversion circuitry operable to convert received DC power into AC power that can be used to drive the coils 122 and/or 124. For example, a rotor controller may include power conversion circuitry operable to convert received DC power into AC first rotor power to activate the first rotor coils 122. Similarly, a stator controller may include power conversion circuitry operable to convert received DC power into AC first stator power to activate the first stator coils 124.

Alternatively, power may be transmitted to the rotor 114 from the stator 116. In such cases, the first rotor 114 may omit an electrical connection to a power source.

Optionally, the first rotor 114 may receive first rotor power from the stator 116. The power transmitted to the rotor 114 can include power supplied to activate the rotor coils 122. The power transmitted to the rotor 114 can also include power required to operate an onboard rotor controller 130*r*.

For example, the first rotor 114 may receive first rotor power to activate the first rotor poles from the stator 116 via an electromagnetic coupling between the stator 116 and the first rotor 114. The plurality of stator coils 124 may include a stator transformer coil 224. The plurality of first rotor coils 122 may include a first rotor transformer coil 222. The first transformer coil 222 may be inductively coupled to the stator transformer coil 224. Power may be inductively coupled to the rotor 114 using the inductive coupling between the stator transformer coil 224 and the first rotor transformer coil 222.

Alternatively, the first rotor may receive first rotor power to activate the first rotor poles from the stator via brushes.

Optionally, the stator controller 130*s* may control power transmission to the rotor 114. The stator controller 130*s* can be configured to control the provision of power through the stator transformer coils 224 and/or through brushes to the rotor 114.

Figure 3:
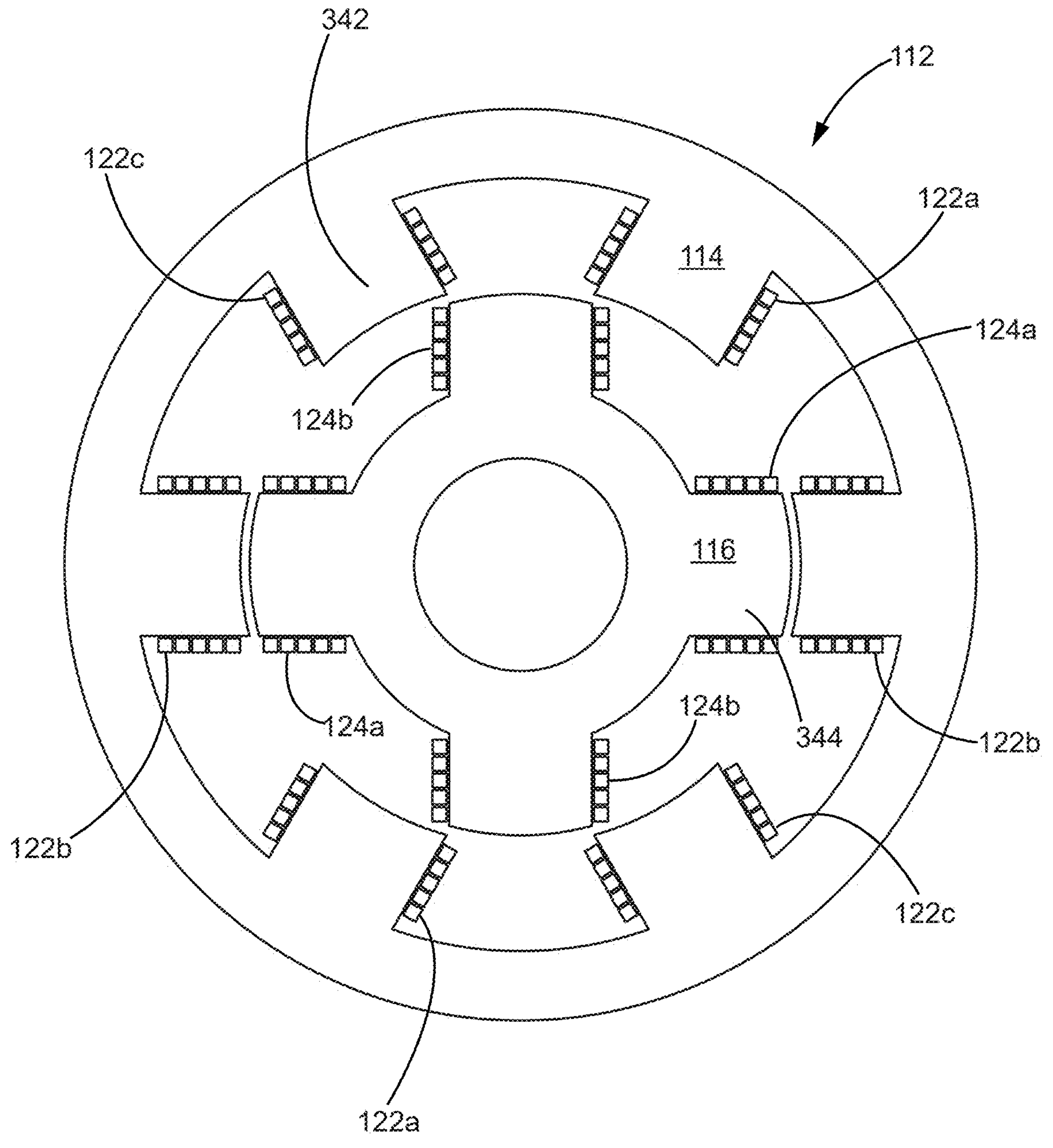
FIG. 3 is a schematic top view of a second example motor assembly.

Referring now to FIG. 3, shown therein is an alternate configuration of a motor 112. In the example motor 112 shown in FIG. 3, the rotor 114 and stator 116 are arranged in a concentric configuration. The operation of the motor 112 shown in FIG. 3 is generally similar to the motor shown in FIGS. 2A-2E, except that the stator 116 is positioned radially inward of the rotor 114 rather than axially spaced from the rotor 114.

In the example illustrated in FIG. 3, the first stator 116 is positioned within the first rotor 114. In other words, the stator 116 can be nested within the first rotor 114 with the plurality of first rotor poles arranged radially outward from the plurality of stator poles. As shown in FIG. 3, the stator 116 is an inner stator and the first rotor 114 is an outer rotor. Accordingly, the first motor 112 shown in the example of FIG. 3 may be an outrunner motor.

As with the axial configuration shown in FIGS. 2A-2D, the rotor poles and stator poles in the motor shown in FIG. 3 can be arranged to face one another. In the concentric configuration shown in FIG. 3, the stator 116 can include a plurality of stator teeth 344. A plurality of stator coils 124 can be provided corresponding to the stator teeth 344. The stator coils 124 may be wound about the stator teeth 344 to define the plurality of stator poles.

The rotor 114 can also include a plurality of rotor teeth 342. A plurality of rotor coils 122 can be provided corresponding to the rotor teeth 342. The rotor coils 122 may be wound about the rotor teeth 342 to define the plurality of rotor poles.

The stator teeth 344 and rotor teeth 342 can extend towards one another within the motor 112. As shown in the example of FIG. 3, the stator teeth 344 (and thereby the stator poles) can extend radially outward towards the rotor 114. The rotor teeth 342 (and thereby the rotor poles) can extend radially inward towards the stator 116.

Alternatively, the first rotor 114 may be positioned within the stator 116. The first rotor 114 may be nested within stator 116 with the plurality of stator poles arranged radially outward from the plurality of first rotor poles. That is, the stator 116 may be an outer stator and the rotor 114 can be an inner rotor. Accordingly, this alternative configuration of motor 112 may be an inrunner motor.

The example motor configuration shown in FIG. 3 is a salient-pole motor configuration. Alternatively, a nonsalient-pole configuration may be used for the rotor 114 and stator 116.

Figure 4A:
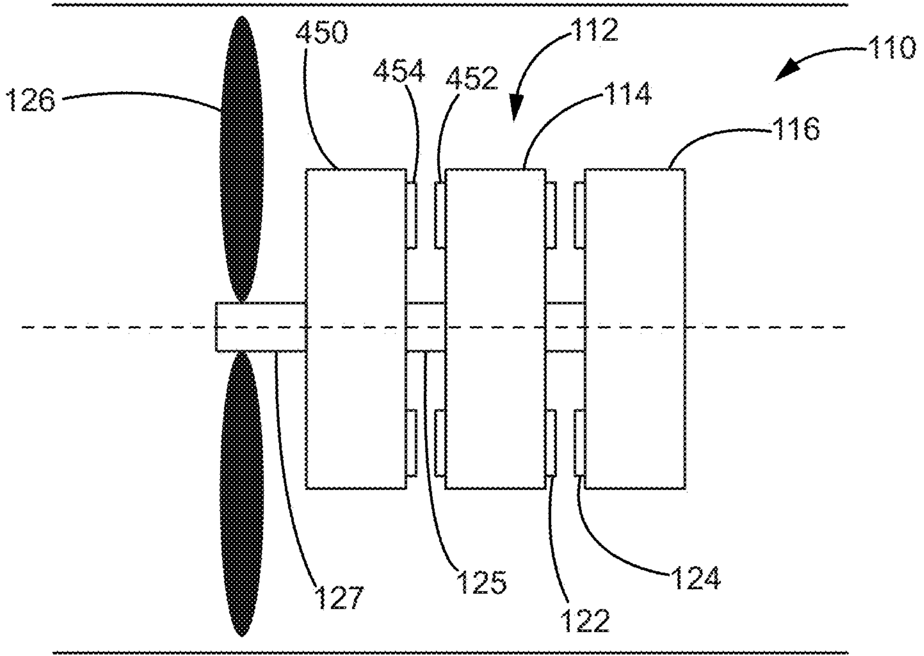
FIG. 4A is a schematic sideview of a third example motor assembly provided in an air flow passage.
Figure 4B:
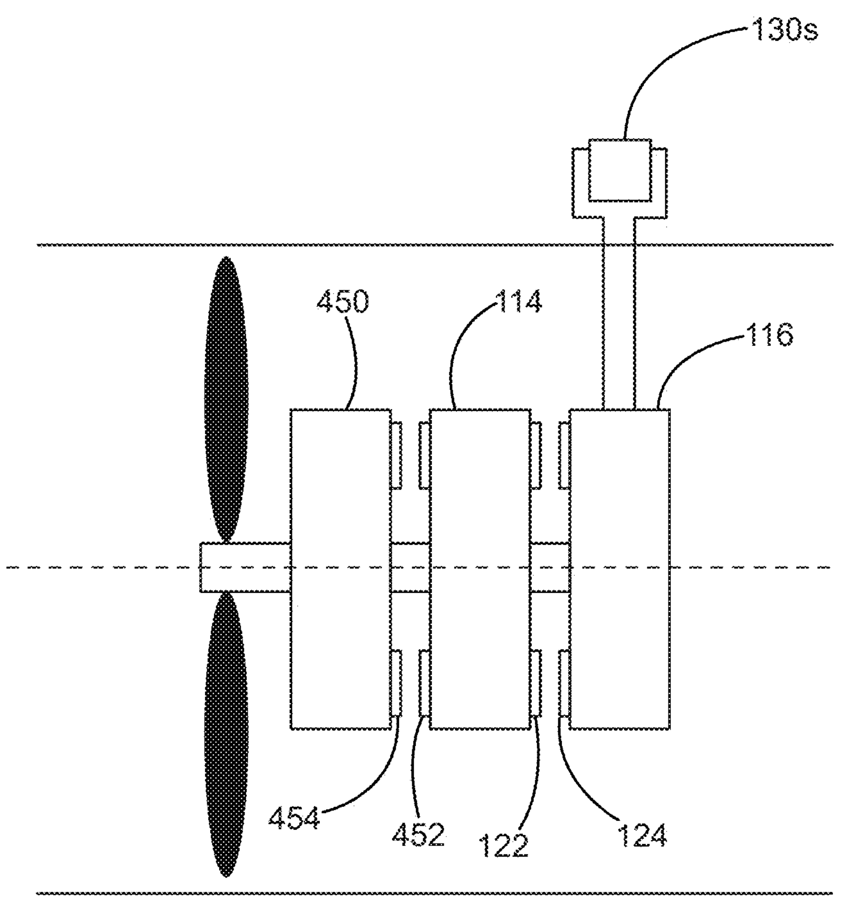
FIG. 4B is a schematic sideview of the third example motor assembly coupled to a controller unit.
Figure 4C:
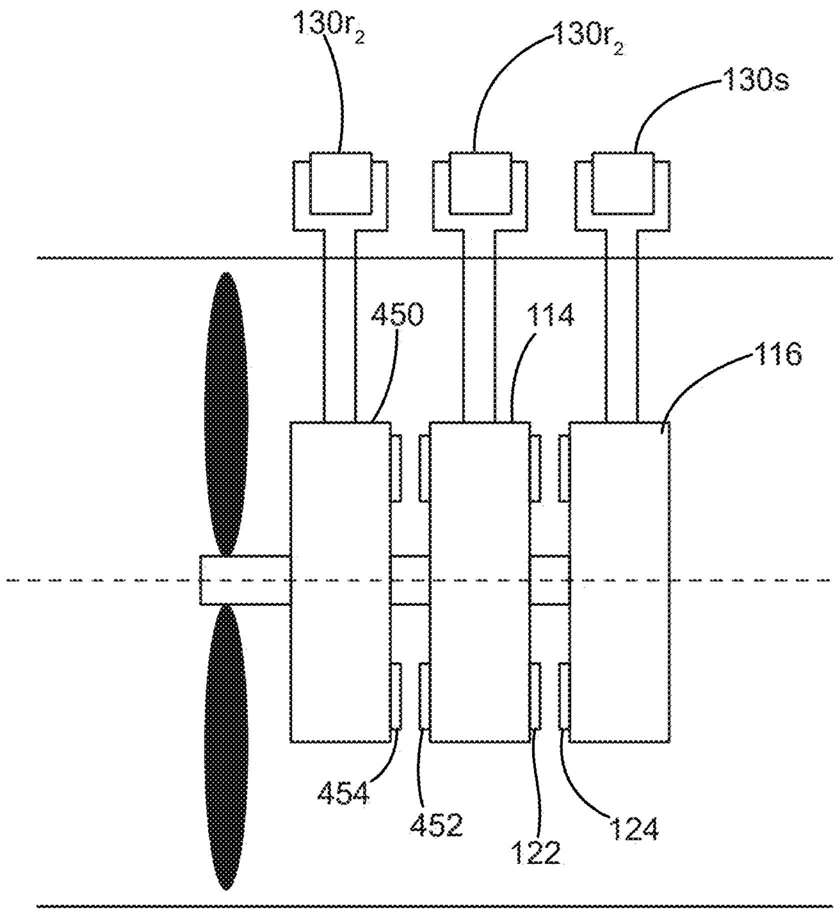
FIG. 4C is a schematic sideview of a first alternate version of the third example motor assembly coupled to a controller unit.

Referring now to FIGS. 4A-4C, shown therein is an example of a motor 112 that includes a plurality of rotors 114/450. The plurality of rotors can be arranged in a sequence of rotors. Although FIGS. 4A-4D show an example of motor 122 with two rotors 114/450 arranged in a sequence, it should be understood that more than two rotors can be arranged in a sequential fashion.

The sequence of rotors can be configured to sequentially increase the rotational speed of each rotor by configuring each rotor to rotate relative to the preceding rotor in the sequence. The rotational speeds of the rotors can thus constructively combine or stack (i.e. be additive to one another) to increase the output rotational speed of the motor 112.

As described herein above, the motor can include a stator 116 including a plurality of circumferentially spaced stator poles and a plurality of stator coils 124. The plurality of stator coils 124 can include a plurality of stator pole coils corresponding to the plurality of stator poles. The motor can also include a first rotor 114 including a plurality of circumferentially spaced first rotor poles and a plurality of first rotor coils 122. The plurality of first rotor coils 122 can include a plurality of first rotor pole coils corresponding to the plurality of first rotor poles. The plurality of first rotor poles can be positioned in a facing arrangement with the plurality of stator poles as described herein above.

In the example illustrated in FIGS. 4A-4C, the motor 112 also includes a second rotor 450. The first rotor 114 is positioned between the stator 116 and second rotor 450.

Similar to first rotor 114, the second rotor 450 can include a plurality of circumferentially spaced second rotor coils. The plurality of second rotor coils 454 can include a plurality of second rotor pole coils defining a plurality of second rotor poles.

The first rotor 114 may be drivingly connected to a rotatable stator that can be used to drive rotation of the second rotor 450. Accordingly, when in use, the second stator may rotate at an RPM equal to the RPM of the first rotor 114. As shown in FIG. 4A, the first rotor 114 and rotatable stator may be integrated as a combined rotor and rotatable stator. The second stator can include a plurality of second stator coils 452 that can operate as stator coils for the second stator. The second stator coils 452 and second rotor coils 454 can be selectively activated to drive rotation of the second rotor 450 relative to the second stator (i.e. first rotor 114 shown in FIG. 4A).

Alternatively, a separate second stator (not shown) may be drivingly connected to the first rotor 114. For example, the first rotatable output shaft 125 may connect the first rotor 114 to the second stator. The second stator may then rotate along with the first rotor 114. In turn, the second rotor 450 can rotate relative to the second stator to increase the RPMs achievable by the second rotor 450.

As shown in FIG. 4A, a second rotatable output shaft may be drivingly connected to a second output shaft 127. That is, the second rotatable output shaft is drivingly connected to the second rotor 450 and has an RPM equal to the RPM of the second rotor 450. The second output shaft 127 can, in turn, be drivingly connected to fan blade 126. Depending on the desired characteristics of the appliance 100, the fan blade 126 may be either an impeller or a propeller.

An advantage of this configuration is that the rotational speed of each rotor may be added to each other to produce a fan assembly 110 that has an output shaft with a higher rate or rotation than could be achieved by an individual motor unit (i.e. a single stator and single rotor) operating independently. Accordingly, using the first rotor 114 to rotate the second stator, while operating the second stator to rotate the second rotor 450, enables the second rotatable output shaft to rotate at an RPM equal to the RPM of the first rotor 114 plus the RPM of the second rotor 450 relative to the second stator. That is, for example, if the first rotor 114 rotates at, e.g., 35,000 RPM and the second rotor 450 rotates relative to the second stator at, e.g., 35,000 RPM, by connecting the second stator to the first rotor 114, the second output shaft 127 may effectively rotate at 70,000 RPM. It will be appreciated that the first rotor 114 may rotate at 10,000-50,000; 15,000-45,000; 20,000-40,000; 25,000-35,000 RPM or any range encompassed therewithin and/or the second rotor 450 may rotate relative to the second stator at 10,000-50,000; 15,000-45,000; 20,000-40,000; 25,000-35,000 RPM or any range encompassed therewithin.

A fan assembly 110 having connected first and second rotors 114 and 450 can be designed to have a smaller diameter and/or a lower dB level (i.e., are quieter) than equivalent motors (i.e., same RPM of the fan blade 126) that are known in the art. Accordingly, for example, while a hair dryer may have a single motor (rotor and stator assembly) which can drive an impeller at 70,000 RPM, such motors may produce a high pitched whine which is unpleasant. Further, while such a motor may be provided with sound insulation, this increases the weight, cost and bult of the appliance. Alternately, if a quieter high speed single motor is used, this may increase the cost and/or weight of the appliance. Using a plurality (two or more) of motor units in series (i.e., ganged in series) as exemplified herein enables the use of low cost, relatively lower speed, commonly available motors to be used while producing a fan assembly 110 that has a relatively higher outlet speed.

The motor 112 can include at least one controller operable to control the activation of the stator coils 124, first rotor coils 122, second stator coils 452 and second rotor coils 454. The at least one controller can be configured to define first stator pole switch signals to control the activation of the first stator poles, first rotor pole switch signals to control the activation of the first rotor poles, second stator pole switch signals to control the activation of the second stator poles, and second rotor pole switch signals to control the activation of the second rotor poles. The first stator pole switch signals, first rotor pole switch signals, second stator pole switch signals, and second rotor pole switch signals can be defined in accordance with a pre-defined control algorithm to provide the desired motoring operation for the motor 112.

Optionally, the motor 112 can include one or more position sensors (e.g. as shown in FIG. 2D) that can be used to determine the rotational position of the motor (e.g. the position of first rotor 114 and second rotor 450). The control signals can be defined at least in part on the rotational position of the motor 112.

Optionally, the at least one controller may include only a single controller operable to define control signals for the stator coils 124, first rotor coils 122, second stator coils 452 and second rotor coils 454. The single controller may provide the control signals to the stator 116, first rotor 114, and second rotor 450 through direct electrical couplings and/or inductive couplings.

For example, the at least one controller may be provided by a stator controller 130*s* as shown in the example of FIG. 4B. In this configuration, the stator controller 130*s* can be configured to define rotor control signals that can be coupled to the first rotor 114 and second rotor 450, e.g. through inductive coupling between the stator 116 and rotor 114.

The first rotor may be operable to receive a first rotor pole switch signal (e.g. from stator controller 130*s*) to control the activation of the first rotor poles. For example, the first rotor may include a passive switching circuit operable to adjust a frequency of activation of the first rotor poles in response to receiving the first rotor pole switch signal. The first rotor 114 may also receive a second stator pole switch signal to control the activation of the second stator poles.

The second rotor may be operable to receive a second rotor pole switch signal to control the activation of the second rotor poles. Optionally, the second rotor pole switch signal may be provided directly to the second rotor, e.g. through an electrical or inductive coupling to the controller. Alternatively, the second rotor pole switch signal may be inductively coupled from the controller to the second rotor 450 via the first rotor 114. Optionally, the second rotor may include a passive switching circuit operable to adjust a frequency of activation of the second rotor poles in response to receiving the second rotor pole switch signal.

Alternatively, the at least one controller may include a plurality of controllers. For example, the at least one controller can include a stator controller 130*s* and at least one rotor controller 130*r*. The at least one rotor controller can include a first rotor controller positioned onboard the first rotor 114. The first rotor controller can be configured to define a first rotor pole switch signal to control the activation of the first rotor coils 122. The first rotor controller can also be configured to define second stator pole switch signals to control the activation of the second stator coils 452.

Optionally, as shown in the example of FIG. 4C, the at least one controller can include a stator controller 130*s* for the stator 116, a first rotor controller 130*r*1 for the first rotor 114, and a second rotor controller 130*r*2 for the second rotor 450.

The first rotor controller 130*r*1 can be electrically connected to the plurality of first rotor coils 114. The first rotor controller 130*r*1 can be configured to control a first flow of current through the first rotor pole coils to drive rotation of the first rotor 114 relative to the stator 116. For example, the first rotor controller 130*r*1 may be operable to adjust a number of active first rotor poles during rotation of the motor 112. Alternatively or in addition, the first rotor controller 130*r*1 may be operable to adjust a switching frequency of the first rotor poles during rotation of the motor. Optionally, the first rotor controller 130*r*1 can be positioned onboard the first rotor 114.

The first rotor controller 130*r*1 can also be electrically connected to the plurality of second stator coils 452, for instance where the first rotor 114 is integral with the second stator. The first rotor controller 130*r*1 can also be configured to control a second stator flow of current through the second stator coils 452.

Similarly, the second rotor controller 130*r*2 can be electrically coupled to the plurality of second rotor coils 454. The second rotor controller 130*r*2 can be configured to control a second rotor flow of current through the second rotor pole coils to drive rotation of the second rotor 450 relative to the second stator (e.g. first rotor 114). The second rotor controller 130*r*2 can be configured to define a second rotor pole switch signal to control the activation of the second rotor poles. For example, the second rotor controller 130*r*2 may be operable to adjust a number of active second rotor poles during rotation of the motor 112. Alternatively or in addition, the second rotor controller 130*r*2 may be operable to adjust a switching frequency of the second rotor poles during rotation of the motor 112. Optionally, the second rotor controller 130*r*2 can be positioned onboard the second rotor 450.

The second rotor controller 130*r*2 can be configured to control the second flow of current through the second rotor pole coils to drive rotation of the second rotor 450 relative to the first stator 116 at a higher speed than the rotation of the first rotor 114 relative to the stator 116. As explained herein above, the second rotor 450 can be driven to rotate relative to the first rotor 114. The first rotor 114 is, in turn, driven to rotate relative to the stator 116. Accordingly, the rotational speed of the first rotor 114 relative to the stator 116 can stack with the rotational speed of the second rotor 450 relative to the first rotor 114 to result in a higher relative speed of rotation of the second rotor 450 relative to the first stator 116.

Power can be supplied to the stator 116, first rotor 114, and second rotor 450 in various ways. At least one of the stator 116, first rotor 114, and second rotor 450 can be electrically connected to the apparatus power supply. For instance, the stator 116 may be electrically connected to the apparatus power supply, e.g. through a direct electrical connector.

Optionally, one or more of the rotors may be electrically connected to the apparatus power supply. For example, the first rotor 114 and/or second rotor 450 may also be directly connected to the same or a different apparatus power supply (e.g. by a plurality of brushes).

Optionally, the first rotor 114 may be coupled to an external power source and may receive first rotor power to activate the first rotor poles from the external power source. The first rotor power may also be used to power a first rotor controller 130*r*1 (if one is present). The first rotor 114 may be coupled to the external power source by a plurality of brushes. Optionally, the plurality of brushes may be arranged to contact a central portion of the first rotor 114.

Alternatively or in addition, the second rotor 450 may be coupled to an external power source and may receive second rotor power to activate the second rotor poles from the external power source. The second rotor power may also be used to power a second rotor controller 130*r*2 (if one is present). The second rotor 450 may be coupled to the external power source by a plurality of brushes. Optionally, the plurality of brushes may be arranged to contact a central portion of the second rotor 450.

Alternatively, one or more of the rotors may omit an electrical connection to a power source. For example, the first rotor 114 and/or second rotor 450 may omit an electrical connection to a power source.

Alternatively or in addition, the first rotor 114 and/or second rotor 450 may receive power inductively from another component of the motor 112. For example, the first rotor 114 may be operable to couple second rotor power to the second rotor 450 (e.g. through the coils 452 and 454). The second rotor coils 454 may be powered by power inductively coupled from the plurality of second stator coils 452. The second rotor controller **130*r*2 (if present) may be powered by power inductively coupled from the plurality of second stator coils 452 to the plurality of second rotor coils 454**.

The first rotor may also be configured to receive first rotor power inductively from the stator 116. The first rotor controller **130*r*1 (if present) may be powered by power inductively coupled from the plurality of stator coils 124 to the plurality of first rotor coils 122**.

Optionally, power may be transmitted to each rotor sequentially (e.g. through a sequence of inductive couplings). For example, the first rotor 114 may receive the second rotor power inductively from the stator 116 along with the first rotor power and may in turn transmit the second rotor power inductively to the second rotor 450.

Alternatively, each rotor may separately receive power transmitted to that rotor (e.g. through separate electrical or inductive couplings).

Optionally, a motor that includes a plurality of rotors can be used to drive a plurality of rotatable output members. For example, the first rotor 114 may be coupled to a first output shaft and the second rotor 450 may be coupled to a different output shaft. The first output shaft may be used to drive a first output member while the second output shaft drives a different second output member.

Figure 4D:
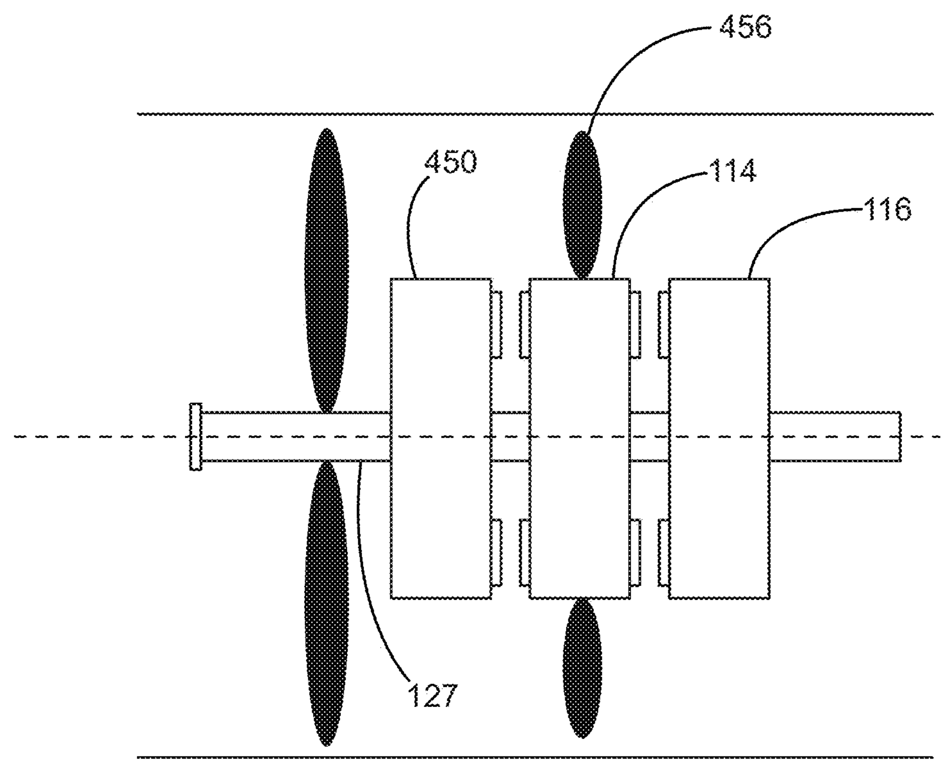
FIG. 4D is a schematic sideview of a second alternate version of the third example motor assembly.

Optionally, as shown in the example of FIG. 4D, the fan assembly may include a first fan 456 and a second fan 126. The first rotor 114 may be drivingly connected to the first fan 456 such that rotation of the first rotor 114 drives the first fan 456. The second rotor 450 may be drivingly connected to the second fan 126 such that rotation of the second rotor 450 drives the second fan 126.

As noted herein above, the second rotor 450 can be driven to rotate at a higher speed than the first rotor 114. That is, the second rotor 450 can be driven to rotate relative to the fixed stator 116 at a higher speed than the rotation of the first rotor 114 relative to the fixed stator 116. As a result, the second fan 125 can be driven at a higher fan speed than the first fan 456.

Figure 4E:
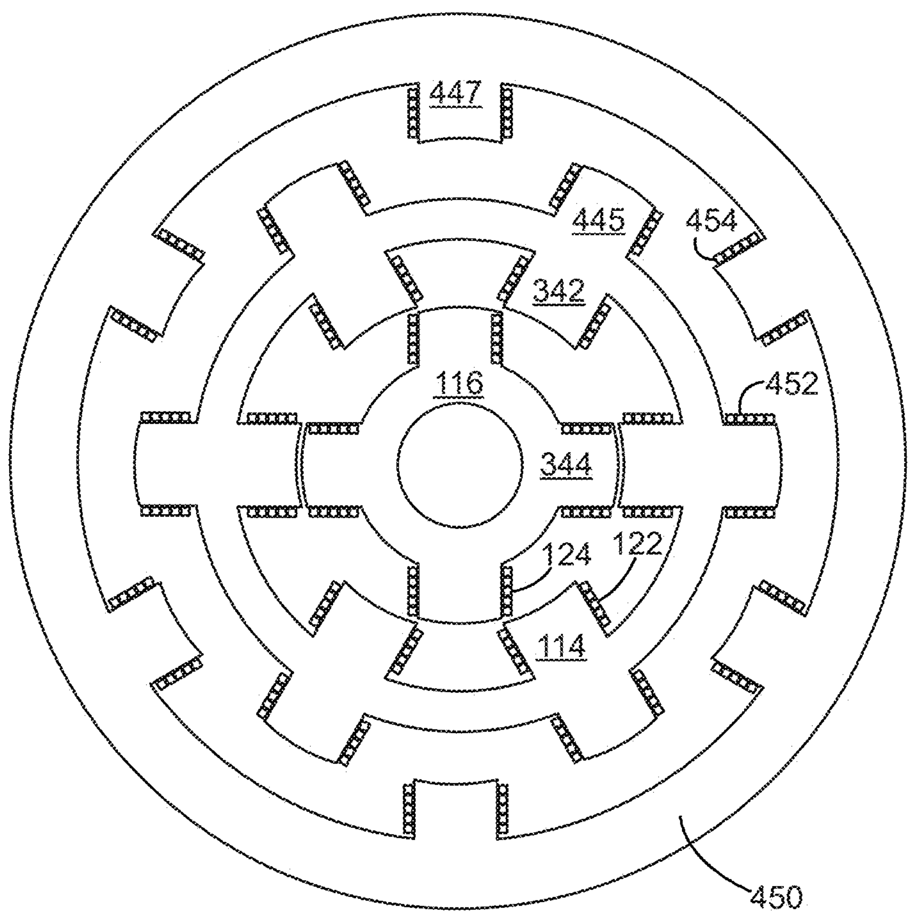
FIG. 4E is a schematic top view of a third alternate version of the third example motor assembly.

FIG. 4E shows an alternate configuration of the motor 112 with a plurality of rotors 114, 450 in a concentric arrangement. As shown in FIG. 4E, the first rotor 114 may be nested within the second rotor 450 with the plurality of second rotor poles arranged radially outward from the plurality of first rotor poles and a plurality of second stator poles provided on the first rotor.

As with the axial configuration shown in FIGS. 4A-4D, the second rotor poles and second stator poles in the motor 112 shown in FIG. 4E can be arranged to face one another. In the concentric configuration shown in FIG. 4E, the second stator 451 can include a plurality of second stator teeth 445. A plurality of second stator coils 452 can be provided corresponding to the second stator teeth 445. The second stator coils 452 may be wound about the second stator teeth 445 to define the plurality of second stator poles.

The second rotor 450 can also include a plurality of second rotor teeth 447. A plurality of second rotor coils 454 can be provided corresponding to the second rotor teeth 447. The second rotor coils 454 may be wound about the second rotor teeth 447 to define the plurality of second rotor poles.

The second stator teeth 445 and second rotor teeth 447 can extend towards one another within the motor 112. As shown in the example of FIG. 4E, the second stator teeth 445 (and thereby the second stator poles) can extend radially outward towards the second rotor 450. The second rotor teeth 447 (and thereby the second rotor poles) can extend radially inward towards the second stator 451.

Alternatively, the second rotor 450 may be positioned within the second stator 451/first rotor 114 with the first rotor 114 arranged within the first stator 116. The first rotor 114 may be nested within the first stator 116 with the plurality of first stator poles arranged radially outward from the plurality of first rotor poles and the second rotor 450 can be nested within the second stator 451/first rotor 114 with the plurality of second stator poles arranged radially outward from the plurality of second rotor poles. That is, the stator 116 may be an outer stator, the first rotor 114 can be an intermediate rotor and the second rotor 450 can be an inner rotor. Accordingly, this alternative configuration of motor 112 may be an inrunner motor.

Although FIG. 4E shows a concentric arrangement of motor 112 with a salient-pole configuration, it should be understood that motor 112 can also be implemented using a concentric nonsalient-pole configuration when multiple rotors are present.

Referring now to FIGS. 5A-5D, shown therein are alternative configurations of a rotor including one or more permanent magnets. The example rotors shown in FIGS. 5A-5D can be used in the example motors described herein.

Figure 5A:
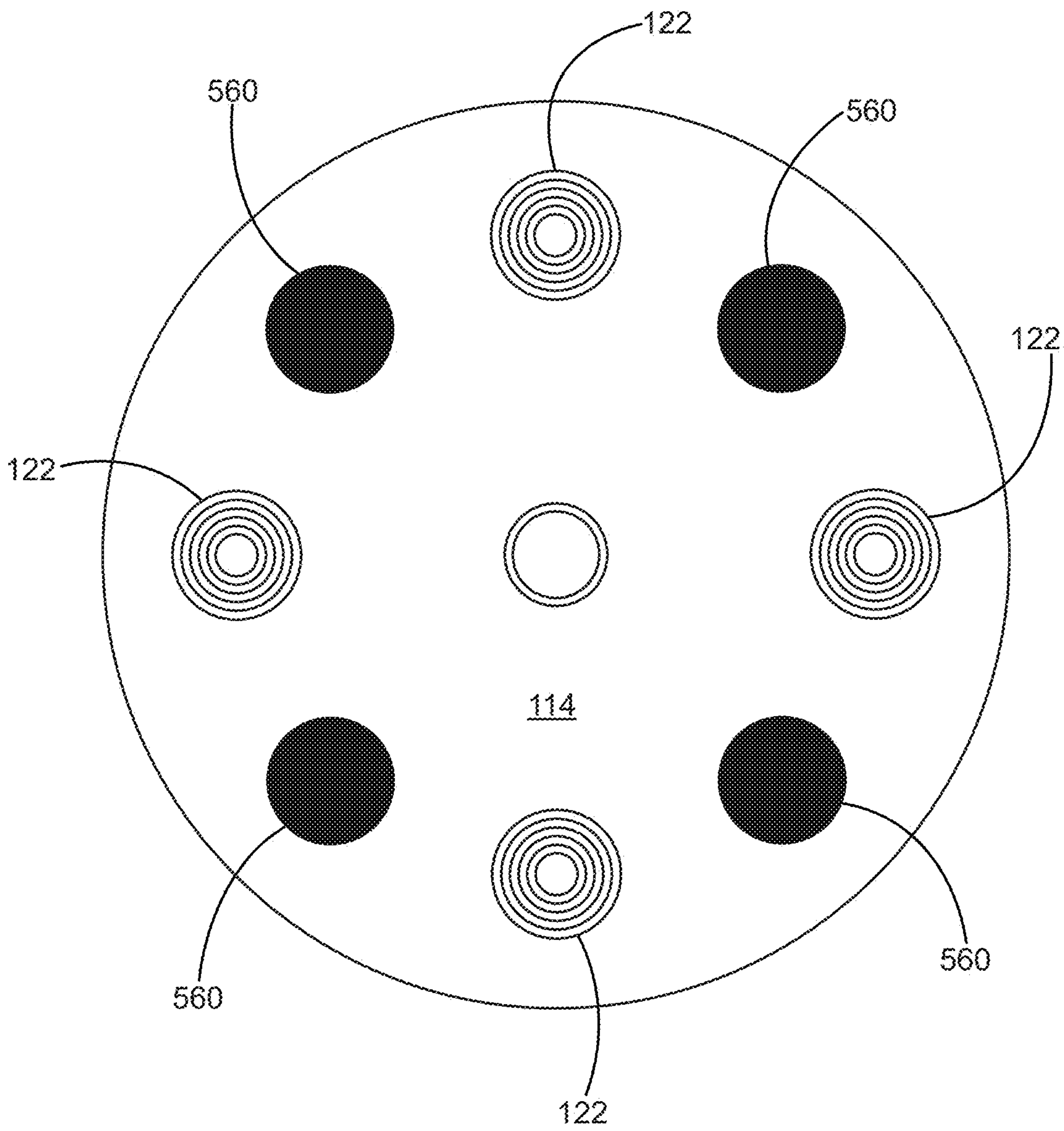
FIG. 5A is a schematic top view of a first example rotor for a fourth example motor assembly.

As shown in FIG. 5A, the rotor 114 may include both permanent magnets 560 and electromagnets 122. The permanent magnets 560 can be arranged to define a plurality of always active poles for the rotor 114 while the electromagnets define selectively activatable poles. Accordingly, the number of active rotor poles and/or the switching frequency of the active rotor poles can be adjusted by controlling the current provided to the rotor coils 122.

Figure 5B:
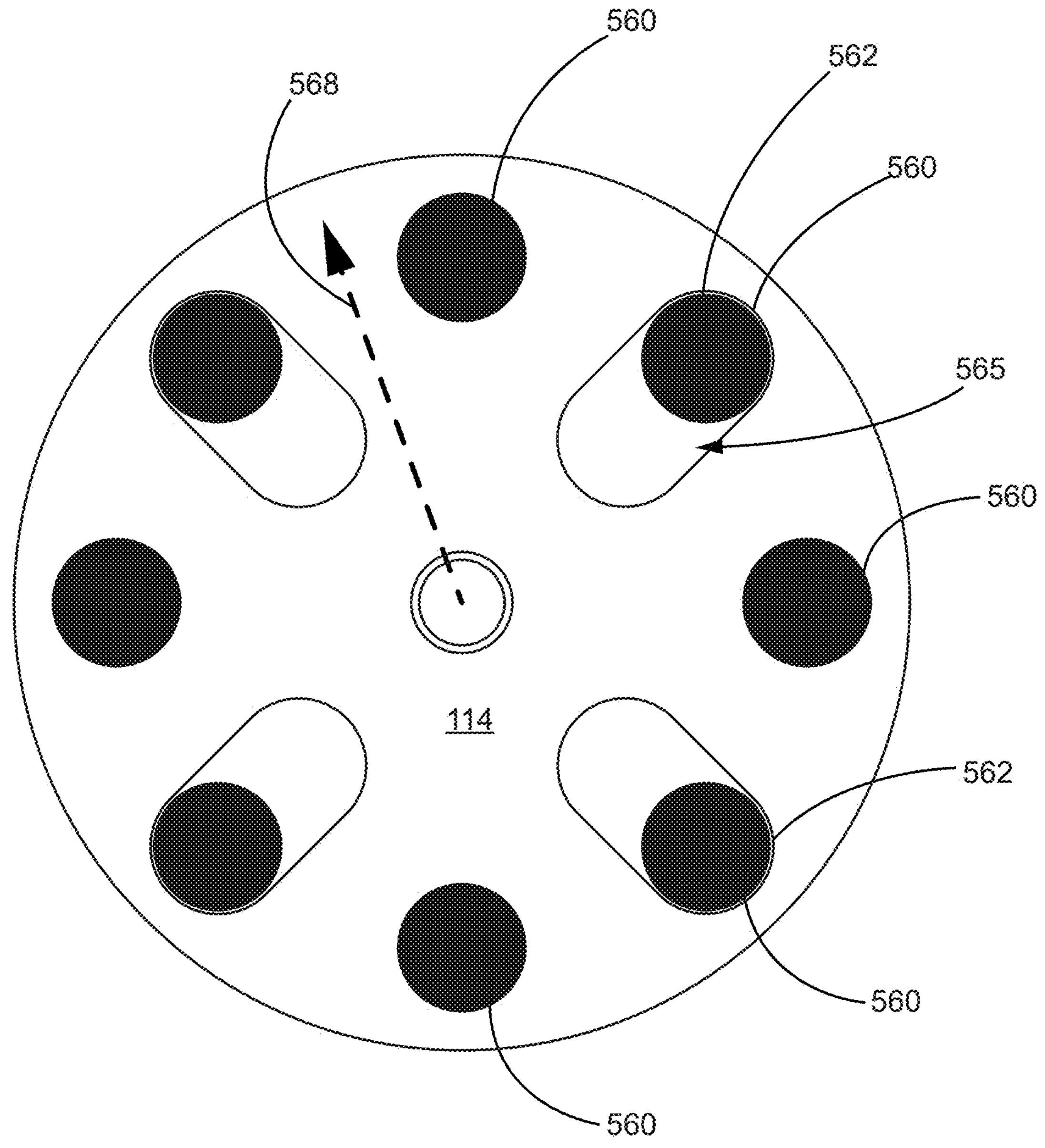
FIG. 5B is a schematic top view of a second example rotor for the fourth example motor assembly in a first operating condition.
Figure 5C:
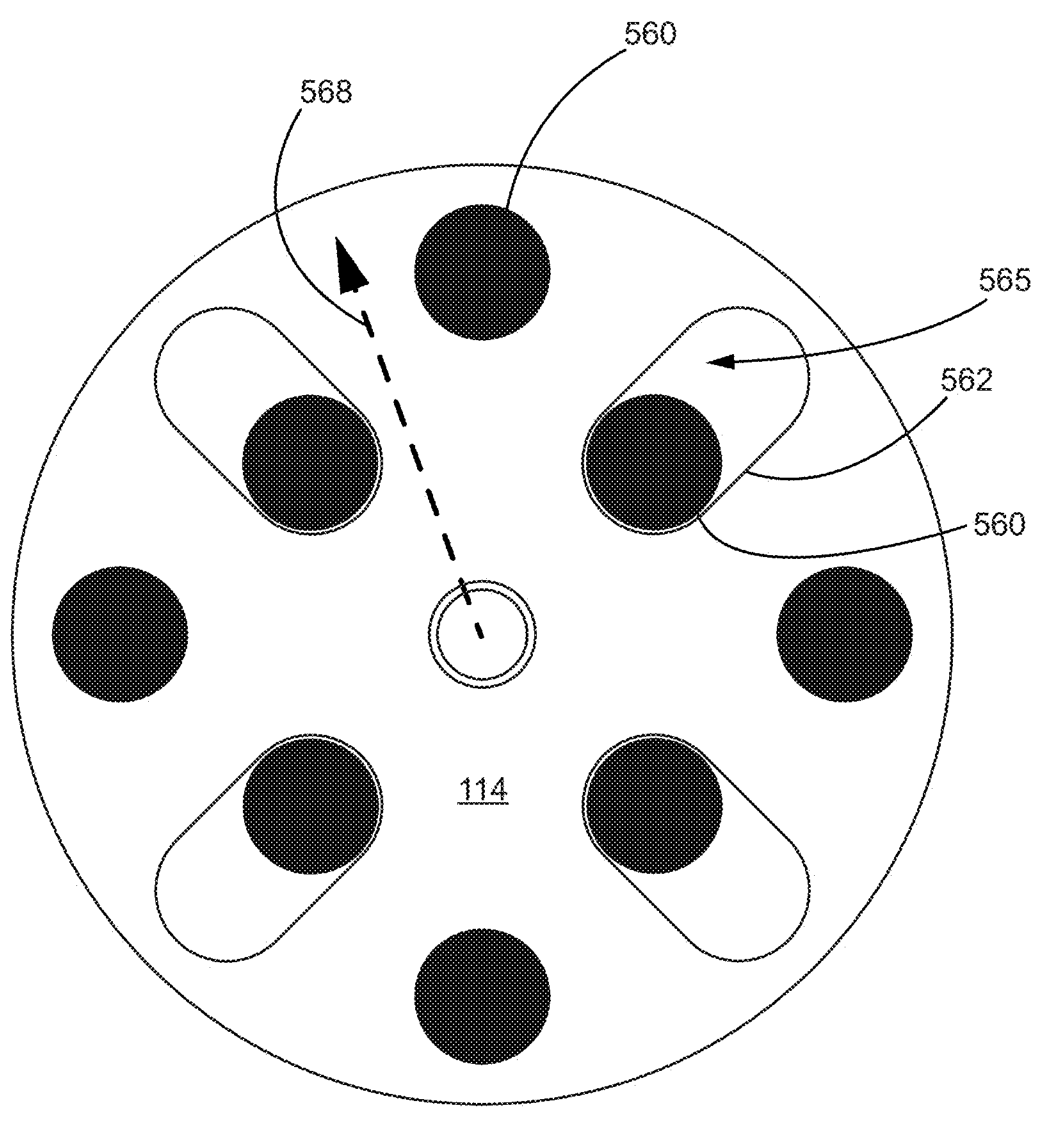
FIG. 5C is a schematic top view of a second example rotor for the fourth example motor assembly in a second operating condition.
Figure 5D:
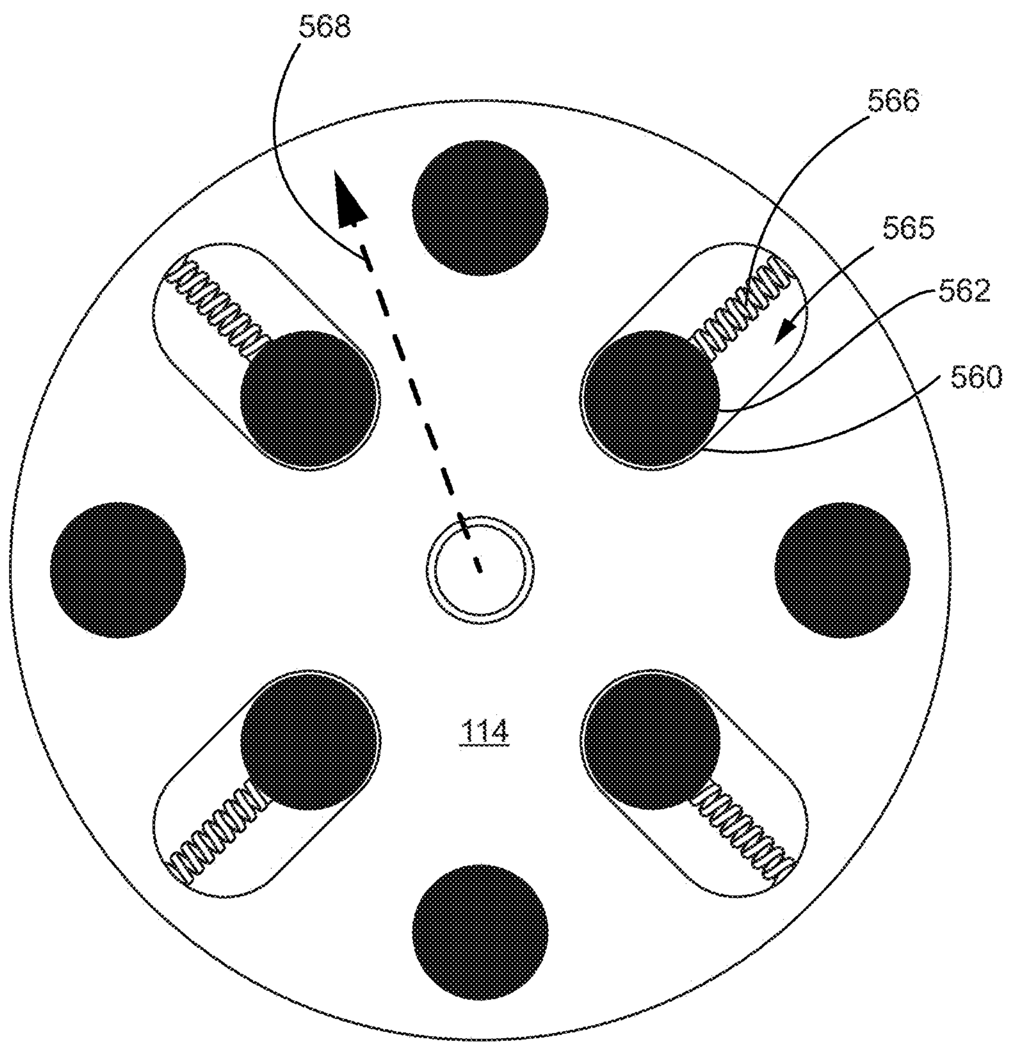
FIG. 5D is a schematic top view of a third example rotor for the fourth example motor assembly in a second operating condition.

Referring now to FIGS. 5B-5D, shown therein is an alternative configuration of a rotor 114 in which all of the rotor poles are provided using permanent magnets. The rotor 114 can include a plurality of circumferentially spaced rotor permanent magnets 560. The rotor permanent magnets 560 can be arranged to define a plurality of first rotor poles (that can be positioned in a facing arrangement with a plurality of stator poles in motor 112). At least a subset of the rotor permanent magnets (a movable subset of rotor permanent magnets or a set of movable rotor permanent magnets) can be movable in a radial direction 568 of the rotor 114. Optionally, the movable subset of rotor permanent magnets may include all of the rotor permanent magnets.

The movable rotor permanent magnets can be moved inwardly or outwardly along the radial direction 568 to adjust the number of first rotor poles active at a given time. The movable rotor permanent magnets 562 may be adjusted between an outer position (see e.g. FIG. 5B) and an inner position (see e.g. FIG. 5C). In the outer position, the movable rotor permanent magnets 562 can be positioned to define an active rotor pole that can interact with corresponding stator poles of a stator in motor 112. In the inner position, the movable rotor permanent magnets 562 may be displaced away from the stator poles so as to not interact with the stator poles and thus may define an inactive pole while in the inner position.

In the example illustrated, the permanent magnets 560 in the movable subset of rotor permanent magnets can be positioned in a corresponding radially extending channel 565. The channels 565 can be provided in the rotor core 114 and can extend in the radial direction 568. Each movable rotor permanent magnet 562 may be movable in the radial direction 568 along the corresponding radially extending channel 565.

Optionally, the rotor 114 may include mechanical members operable to adjust the position of the movable rotor permanent magnets 562. Each movable rotor permanent magnet 562 may have a corresponding mechanical member attached thereto and operable to move that movable rotor permanent magnet 562 between the inner and outer positions.

For example, each radially extending channel 565 may have a corresponding mechanical member 566 operable to move radially within the channel 565. Each movable rotor permanent magnet 562 may then be movable in the radial direction 568 along the corresponding radially extending channel 565 in response to motion of the mechanical member 566.

Optionally, the movable permanent magnets may be moved dependent on the speed of the rotor 114. For example, the movable subset of rotor permanent magnets may be automatically movable in the radial direction in response to an increase in rotational speed of the rotor 114. This may allow the rotor 114 to increase its rotational speed in a smoother fashion.

Optionally, the mechanical member 566 can actively move the movable rotor permanent magnet 562 between the inner position and the outer position.

Alternatively or in addition, the movable permanent magnets 562 may be biased to an inner position (e.g. as shown in FIG. 5C). The movable permanent magnets 562 may be moved out centrifugally as the speed of the rotor 114 increases to increase the number of rotor poles.

For example, the mechanical member 566 can be or include a biasing member such as a spring. The biasing member can bias the mechanical member 566 to an inward position in which the corresponding movable rotor permanent magnet 562 is positioned at a radial inward end of the corresponding radially extending channel 565. This may allow the mechanical member 566 to adjust the position of the movable rotor permanent magnet 562 passively and automatically in response to an increase in the speed of the rotor 114.

General Description of a Method of Energizing a Fan Assembly

In accordance with one aspect of this disclosure, which may be used by itself or in combination with any other aspect of this disclosure, there is a method of energizing the fan assembly 110 of a portable appliance 100. This aspect may be used by itself or with one or more of the other aspects set out herein.

In examples of the fan assembly 110 that include a second rotor 450 in sequence with a first rotor 114, a method of energizing the fan assembly 110 may include the steps of (a) energizing the first stator 116 and first rotor 114; and (b) subsequently energizing the second stator and second rotor 450 once the first rotor 114 has commenced rotation. As described above, rotation produced by each of the first and second rotors 114, 450 is constructively combined.

For example, in some embodiments, the first rotor 114 may be rotatable to at least 20,000 RPM and the second rotor 450 may be rotatable to at least 20,000 RPM relative to the first rotor 114. Accordingly, the second rotatable output shaft 127 of the second rotor 450 may be rotated to at least 40,000 RPM.

In some exemplary methods, the second stator and second rotor 450 may not be energized until the first rotor 114 is rotating at a minimum of 40%, 50%, 60%, 70%, 80%, 90% or 100% of a maximum rotational speed of the first rotor 114.

As described above, the fan assembly 110 may be provided in an air flow passage 102 of an appliance 100. Accordingly, the method for energizing the fan assembly 110 may include the step of a user actuating the appliance 100 whereupon the first stator 116 and first rotor 114 is energized and the second (driven) stator and rotor 450 are subsequently automatically energized so that the fan assembly 110 produces an air flow in the air flow passage 102.

In some examples, the appliance 100 may be a surface cleaning apparatus and the fan assembly 110 may produce an air flow of at least 10, 15, 20, 25, 30, 35, 40, 45, 50, 55, 60, 65 70 or more CFM in the surface cleaning apparatus. In other examples, the appliance 100 may be a hair dryer and the fan assembly 110 may produce an output air flow of at least 10, 15, 20, 25, 30, 35, 40, 45, 50, 55, 60, 65 70 or more CFM from the hair dryer. Such air flow rates may be achieved using a smaller diameter fan blade and may therefore enable the use of a smaller diameter fan and motor assembly.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

What is claimed is:

1. A motor comprising:

a stator comprising a plurality of circumferentially spaced stator poles and a plurality of stator coils, the plurality of stator coils comprising a plurality of stator pole coils corresponding to the plurality of stator poles;

a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles;

a second rotor comprising a plurality of circumferentially spaced second rotor poles and a plurality of second rotor coils, the plurality of second rotor coils comprising a plurality of second rotor pole coils corresponding to the plurality of second rotor poles, wherein the plurality of second rotor poles are positioned in a facing arrangement with a plurality of second stator poles provided by a rotatable second stator; and at least one controller, the at least one controller operable to independently control activation of the stator poles and the first rotor poles to thereby induce rotation of the motor, wherein the at least one controller is operable to control the provision of a rotor control signal to the first rotor, wherein the rotor control signal is defined to control the activation of the first rotor poles;

wherein rotation of the second stator is driven by rotation of the first rotor.

2. The motor of claim 1, wherein the at least one controller is operable to independently control at least one of a stator switching frequency of the stator poles and a first rotor switching frequency of the first rotor poles.

3. The motor of claim 2, wherein the at least one controller is operable to independently control the stator switching frequency of the stator poles and the first rotor switching frequency of the first rotor poles.

4. The motor of claim 1, wherein one of the stator switching frequency of the stator poles and the first rotor switching frequency of the first rotor poles is a fixed frequency.

5. The motor of claim 1, wherein the at least one controller is operable to independently control at least one of a stator pole active number of stator poles or a first rotor pole active number of first rotor poles.

6. The motor of claim 1, wherein the first rotor receives first rotor power to activate the first rotor poles from the stator via an electromagnetic coupling between the stator and the first rotor.

7. The motor of claim 1, wherein the first rotor receives first rotor power to activate the first rotor poles from the stator via brushes.

8. The motor of claim 1, wherein the second stator is integral with the first rotor.

9. The motor of claim 1, wherein the first rotor is coupled to an external power source and the stator is separately coupled to the external power source, and the first rotor receives first rotor power to activate the first rotor poles from the external power source.

10. The motor of claim 1, wherein the at least one controller includes a rotor controller positioned onboard the first rotor, wherein the rotor controller is operable to define a first rotor pole switch signal to control the activation of the first rotor poles.

11. The motor of claim 1, wherein the first rotor is operable to receive a first rotor pole switch signal to control the activation of the first rotor poles.

12. The motor of claim 11, wherein the first rotor comprises a passive switching circuit operable to adjust a frequency of activation of the first rotor poles in response to receiving the first rotor pole switch signal.

13. The motor of claim 1, further comprising a first rotor position sensor operable to detect a rotational position of the first rotor, wherein the at least one controller is operable to independently control activation of the stator poles and the first rotor poles based on the detected rotational position of the first rotor.

14. A motor comprising:

a stator comprising a plurality of circumferentially spaced stator poles and a plurality of stator coils, the plurality of stator coils comprising a plurality of stator pole coils corresponding to the plurality of stator poles;

a first rotor comprising a plurality of circumferentially spaced first rotor poles and a plurality of first rotor coils, the plurality of first rotor coils comprising a plurality of first rotor pole coils corresponding to the plurality of first rotor poles, wherein the plurality of first rotor poles are positioned in a facing arrangement with the plurality of stator poles;

a second rotor, wherein the first rotor is positioned between the stator and the second rotor, and the first rotor is operable to couple second rotor power to the second rotor, wherein the second rotor power is received from the stator along with the first rotor power; and at least one controller, the at least one controller operable to independently control activation of the stator poles and the first rotor poles to thereby induce rotation of the motor, wherein the at least one controller is operable to control the provision of a rotor control signal to the first rotor, wherein the rotor control signal is defined to control the activation of the first rotor poles.

15. The motor of claim 14, wherein the first rotor receives first rotor power to activate the first rotor poles from the stator via brushes.

16. A motor comprising:

a first stator comprising a plurality of circumferentially spaced first stator coils, the plurality of first stator coils defining a plurality of first stator poles, wherein the first stator is fixed;

a first rotor comprising a plurality of circumferentially spaced first rotor coils, the plurality of first rotor coils defining a plurality of first rotor poles, wherein the plurality of first rotor poles are positioned in a facing arrangement with the plurality of first stator poles;

a movable second stator drivingly connected to the first rotor, the second stator comprising a plurality of circumferentially spaced second stator coils, the plurality of second stator coils defining a plurality of second stator poles, wherein rotation of the second stator is driven by rotation of the first rotor; and a second rotor comprising a plurality of circumferentially spaced second rotor coils, the plurality of second rotor coils defining a plurality of second rotor poles, wherein the plurality of second rotor poles are positioned in a facing arrangement with the plurality of second stator poles.

17. The motor of claim 16, wherein the second stator and first rotor are integral.

18. The motor of claim 16, wherein the first rotor is positioned between the second rotor and the first stator.

19. The motor of claim 16, further comprising:

a movable third stator drivingly connected to the second rotor, the third stator comprising a plurality of circumferentially spaced third stator coils, the plurality of third stator coils defining a plurality of third stator poles, wherein rotation of the third stator is driven by rotation of the second rotor; and a third rotor comprising a plurality of circumferentially spaced third rotor coils, the plurality of third rotor coils defining a plurality of third rotor poles, wherein the plurality of third rotor poles are positioned in a facing arrangement with the plurality of third stator poles.

20. The motor of claim 16, wherein at least one of the second rotor or the third rotor are drivingly connected to a motor output shaft.

* * * * *